US009069631B2

(12) United States Patent
Blocksome et al.

(10) Patent No.: US 9,069,631 B2
(45) Date of Patent: Jun. 30, 2015

(54) FENCING DATA TRANSFERS IN A PARALLEL ACTIVE MESSAGING INTERFACE OF A PARALLEL COMPUTER

(75) Inventors: Michael A. Blocksome, Rochester, MN (US); Amith R. Mamidala, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 688 days.

(21) Appl. No.: 12/940,198

(22) Filed: Nov. 5, 2010

(65) Prior Publication Data

US 2012/0117211 A1    May 10, 2012

(51) Int. Cl.
*G06F 15/16*    (2006.01)
*G06F 15/173*    (2006.01)
*G06F 7/38*    (2006.01)
*G06F 9/54*    (2006.01)
*H04L 29/06*    (2006.01)

(52) U.S. Cl.
CPC ............... *G06F 9/546* (2013.01); *H04L 67/40* (2013.01); *G06F 15/16* (2013.01)

(58) Field of Classification Search
CPC .......... H04L 67/40; G06F 9/546; G06F 15/16
USPC .................................. 709/223, 201; 712/225
See application file for complete search history.

(56) References Cited

U.S. PATENT DOCUMENTS

| | | | |
|---|---|---|---|
| 4,893,303 A | 1/1990 | Nakamura | |
| 5,488,608 A | 1/1996 | Flammer, III | |
| 5,802,278 A | 9/1998 | Isfeld et al. | |
| 6,070,189 A | 5/2000 | Bender et al. | |
| 6,337,852 B1 | 1/2002 | Desnoyers et al. | |
| 6,438,748 B1 | 8/2002 | Gard et al. | |
| 6,519,310 B2 | 2/2003 | Chapple | |
| 6,553,002 B1 | 4/2003 | Bremer et al. | |
| 6,553,031 B1 | 4/2003 | Nakamura et al. | |
| 6,591,310 B1 | 7/2003 | Johnson | |
| 6,601,089 B1 | 7/2003 | Sistare et al. | |
| 6,801,927 B1 | 10/2004 | Smith et al. | |

(Continued)

OTHER PUBLICATIONS

Knudson, Brant; "IBM System Blue Gene Solution: Blue Gene/P Application Development," *IBM Redbooks*, pp. 1-406, Sep. 2009.

(Continued)

*Primary Examiner* — Viet Vu
*Assistant Examiner* — Herman Belcher
(74) *Attorney, Agent, or Firm* — Kennedy Lenart Spraggins LLP

(57) ABSTRACT

Fencing data transfers in a parallel active messaging interface ('PAMI') of a parallel computer, the PAMI including data communications endpoints, each endpoint comprising a specification of data communications parameters for a thread of execution on a compute node, including specifications of a client, a context, and a task, the compute nodes coupled for data communications through the PAMI and through data communications resources including a deterministic data communications network, including initiating execution through the PAMI of an ordered sequence of active SEND instructions for SEND data transfers between two endpoints, effecting deterministic SEND data transfers; and executing through the PAMI, with no FENCE accounting for SEND data transfers, an active FENCE instruction, the FENCE instruction completing execution only after completion of all SEND instructions initiated prior to execution of the FENCE instruction for SEND data transfers between the two endpoints.

12 Claims, 15 Drawing Sheets

(56) References Cited

U.S. PATENT DOCUMENTS

| | | | |
|---|---|---|---|
| 6,847,911 | B2 | 1/2005 | Huckaby et al. |
| 6,847,991 | B1 | 1/2005 | Kurapati |
| 6,993,769 | B2 | 1/2006 | Simonson et al. |
| 7,155,560 | B2 | 12/2006 | McGrew et al. |
| 7,237,036 | B2 | 6/2007 | Boucher et al. |
| 7,328,300 | B2 | 2/2008 | Bennett |
| 7,392,352 | B2 * | 6/2008 | Mithal et al. ............ 711/147 |
| 7,418,470 | B2 | 8/2008 | Howard et al. |
| 7,464,138 | B2 | 12/2008 | Le et al. |
| 7,533,197 | B2 | 5/2009 | Leonard et al. |
| 7,552,312 | B2 | 6/2009 | Archer et al. |
| 7,673,011 | B2 | 3/2010 | Archer et al. |
| 7,991,978 | B2 | 8/2011 | Kuesel et al. |
| 8,001,280 | B2 | 8/2011 | Blumrich et al. |
| 8,018,951 | B2 | 9/2011 | Blocksome |
| 8,041,969 | B2 | 10/2011 | Archer et al. |
| 8,250,164 | B2 | 8/2012 | Archer et al. |
| 8,286,188 | B1 | 10/2012 | Brief |
| 2002/0054051 | A1 | 5/2002 | Ladd |
| 2003/0093485 | A1 | 5/2003 | Dougall et al. |
| 2003/0195991 | A1 | 10/2003 | Masel et al. |
| 2005/0166209 | A1 | 7/2005 | Merrick et al. |
| 2005/0289235 | A1 | 12/2005 | Suematsu et al. |
| 2006/0059257 | A1 | 3/2006 | Collard et al. |
| 2006/0101104 | A1 | 5/2006 | Bhanot et al. |
| 2006/0182128 | A1 | 8/2006 | Nakata et al. |
| 2006/0227774 | A1 | 10/2006 | Hoenicke |
| 2007/0078997 | A1 | 4/2007 | Stern |
| 2007/0124453 | A1 | 5/2007 | Slaughter et al. |
| 2007/0169176 | A1 | 7/2007 | Cook et al. |
| 2007/0169179 | A1 | 7/2007 | Narad |
| 2008/0101295 | A1 | 5/2008 | Tomita et al. |
| 2008/0126739 | A1 | 5/2008 | Archer et al. |
| 2008/0281998 | A1 | 11/2008 | Archer et al. |
| 2009/0003344 | A1 | 1/2009 | Kumar |
| 2009/0006808 | A1 * | 1/2009 | Blumrich et al. ............ 712/12 |
| 2009/0006810 | A1 | 1/2009 | Almasi et al. |
| 2009/0007141 | A1 | 1/2009 | Blocksome et al. |
| 2009/0022156 | A1 | 1/2009 | Blocksome |
| 2009/0037377 | A1 | 2/2009 | Archer et al. |
| 2009/0089670 | A1 | 4/2009 | Gooding et al. |
| 2009/0129277 | A1 | 5/2009 | Supalov et al. |
| 2009/0138892 | A1 | 5/2009 | Almasi et al. |
| 2009/0254920 | A1 | 10/2009 | Truschin et al. |
| 2010/0005189 | A1 | 1/2010 | Archer et al. |
| 2010/0036940 | A1 | 2/2010 | Carey et al. |
| 2010/0058356 | A1 | 3/2010 | Aho et al. |
| 2010/0232448 | A1 | 9/2010 | Sugumar et al. |
| 2011/0314255 | A1 | 12/2011 | Krishna et al. |
| 2012/0079035 | A1 | 3/2012 | Archer et al. |
| 2012/0079133 | A1 | 3/2012 | Archer et al. |
| 2012/0117137 | A1 | 5/2012 | Blocksome et al. |
| 2012/0117138 | A1 | 5/2012 | Blocksome et al. |
| 2012/0117211 | A1 | 5/2012 | Blocksome et al. |
| 2012/0117281 | A1 | 5/2012 | Blocksome et al. |
| 2012/0137294 | A1 | 5/2012 | Archer et al. |
| 2012/0144400 | A1 | 6/2012 | Davis et al. |
| 2012/0144401 | A1 | 6/2012 | Faraj |
| 2012/0151485 | A1 | 6/2012 | Archer et al. |
| 2012/0179736 | A1 | 7/2012 | Blocksome et al. |
| 2012/0179760 | A1 | 7/2012 | Blocksome et al. |
| 2012/0185679 | A1 | 7/2012 | Archer et al. |
| 2012/0185873 | A1 | 7/2012 | Archer et al. |
| 2012/0254344 | A1 | 10/2012 | Archer et al. |
| 2013/0061244 | A1 | 3/2013 | Davis et al. |
| 2013/0061245 | A1 | 3/2013 | Faraj |
| 2013/0067111 | A1 | 3/2013 | Archer et al. |
| 2013/0067206 | A1 | 3/2013 | Archer et al. |
| 2013/0073751 | A1 | 3/2013 | Blocksome et al. |
| 2013/0074097 | A1 | 3/2013 | Archer et al. |
| 2013/0081059 | A1 | 3/2013 | Archer et al. |
| 2013/0091510 | A1 | 4/2013 | Archer et al. |
| 2013/0097263 | A1 | 4/2013 | Blocksome et al. |
| 2013/0097404 | A1 | 4/2013 | Blocksome et al. |
| 2013/0097614 | A1 | 4/2013 | Blocksome et al. |
| 2013/0110901 | A1 | 5/2013 | Blocksome et al. |
| 2013/0117403 | A1 | 5/2013 | Archer et al. |
| 2013/0117761 | A1 | 5/2013 | Archer et al. |
| 2013/0117764 | A1 | 5/2013 | Archer et al. |
| 2013/0124666 | A1 | 5/2013 | Archer et al. |
| 2013/0125135 | A1 | 5/2013 | Archer et al. |
| 2013/0125140 | A1 | 5/2013 | Archer et al. |
| 2013/0174180 | A1 | 7/2013 | Blocksome et al. |
| 2013/0185465 | A1 | 7/2013 | Blocksome |

OTHER PUBLICATIONS

Blocksome, Michael; "Optimizing MPI Collectives using Efficient Intra-node Communication Techniques over the BlueGene/P Supercomputer," *Computer Science IBM Research Report*, Dec. 2010.
Robinson et al., "A Task Migration Implementation of the Message-Passing Interference", May 1996, IEEE, HPDC 5'96, pp. 61-68.
Office Action, U.S. Appl. No. 12/959,539, Oct. 26, 2012.
Office Action, U.S. Appl. No. 12/892,192, Oct. 30, 2012.
Final Office Action, U.S. Appl. No. 12/892,153, Sep. 25, 2012.
Office Action, U.S. Appl. No. 12/940,300, Sep. 19, 2012.
Office Action, U.S. Appl. No. 12/963,694, Dec. 24, 2012.
Office Action, U.S. Appl. No. 13/290,670, Dec. 17, 2012.
Office Action, U.S. Appl. No. 13/290,642, Jan. 7, 2013.
U.S. Appl. No. 12/985,651, Jan. 6, 2011.
U.S. Appl. No. 13/290,670, Nov. 7, 2011.
U.S. Appl. No. 13/290,642, Nov. 7, 2011.
U.S. Appl. No. 13/292,293, Nov. 9, 2011.
U.S. Appl. No. 13/659,370, Oct. 24, 2012.
U.S. Appl. No. 13/659,458, Oct. 24, 2012.
U.S. Appl. No. 13/668,503, Nov. 5, 2012.
U.S. Appl. No. 13/671,762, Nov. 8, 2012.
U.S. Appl. No. 13/673,188, Nov. 9, 2012.
U.S. Appl. No. 13/677,993, Nov. 15, 2012.
U.S. Appl. No. 13/678,799, Nov. 16, 2012.
U.S. Appl. No. 13/677,507, Nov. 15, 2012.
U.S. Appl. No. 13/679,042, Nov. 16, 2012.
U.S. Appl. No. 13/690,168, Nov. 30, 2012.
U.S. Appl. No. 13/681,903, Nov. 20, 2012.
U.S. Appl. No. 13/680,772, Nov. 19, 2012.
Office Action, U.S. Appl. No. 12/892,153, Jun. 1, 2012.
Foster et al., Managing Multiple Communication Method in High-Performance Networked Computing Systems. http://www.mcs.anl.gov/nexus, 1997, pp. 1-25.
Robinson et al., "A Task Migration Implementation of the Message-Passing Interface", May 1996, IEEE, HPDC—5'96, pp. 61-68.
A Message Passing Interface for Parallel and Distributed Computing, Hairi et al., 1993, pp. 1-8.
Introduction to Parallel Computing and the Message Passing Interface (MPI), Kuiper, 2008, pp. 1-39.
Parallel net DCF A High-Performance Scientific I/O Interface, Li et al., 2003, pp. 1-11.
HPSS MPI-IO: A Standard Parallel Interface to HPSS File System, Loewe, 2001, pp. 1-19.
Notice of Allowance, U.S. Appl. No. 12/959,455, Mar. 1, 2013.
Notice of Allowance, U.S. Appl. No. 12/959,539, Mar. 6, 2013.
Office Action, U.S. Appl. No. 13/007,860, Mar. 19, 2013.
Office Action, U.S. Appl. No. 12/963,671, Mar. 1, 2013.
Office Action, U.S. Appl. No. 12/940,198, Feb. 14, 2013.
Office Action, U.S. Appl. No. 12/940,282, Feb. 5, 2013.
Notice of Allowance, U.S. Appl. No. 13/290,670, Mar. 27, 2013.
Office Action, U.S. Appl. No. 13/668,503, Feb. 13, 2013.
Office Action, U.S. Appl. No. 13/673,188, Mar. 5, 2013.
Office Action, U.S. Appl. No. 13/678,799, Feb. 5, 2013.
Office Action, U.S. Appl. No. 13/681,903, Apr. 2, 2013.
Office Action, U.S. Appl. No. 13/709,305, Mar. 25, 2013.
Office Action, U.S. Appl. No. 13/711,108, Mar. 22, 2013.
Kumar et al., "The Deep Computing Messaging Framework: Generalized Scalable Message Passing Blue Gene/P Supercomputer", Proceedings of the 22nd Annual International Conference on Supercomputing (ICS '08), Jun. 2008, pp. 94-103, ACM New York, USA.

(56) References Cited

OTHER PUBLICATIONS

Banikazemi et al., "MPI-LAPI: An Efficient Implementation of MPI for IBM RS/6000 SP Systems", IEEE Transactions on Parallel and Distributed Systems, Oct. 2001, vol. 12, Issue 10, pp. 1081-1093, IEEE Xplore Digital Library (online publication), IEEE.org, USA, DOI: 10.1109/71.963419.

Myricom, "Myrinet Express (MX): A High-Performance, Low-Level, Message-Passing Interface for Myrinet", Myricom.com (online publication), Version 1.2, Oct. 2006, pp. 1 -65, Myricom Inc., USA.

Ce Dinan et al., "Hybrid Parallel Programming With MPI and Unified Parallel C", Proceedings of the 7th ACM International Conference on Computing Frontiers (CF'10), May 2010, pp. 177—86, ACM New York, USA.

Dozsa et al., "Enabling Concurrent Multithreaded MPI Communication on Multicore Petascale Systems", Proceedings of the 17th European MPI Users' Group Meeting Conference on Recent Advances in the Message Passing Interface (EuroMPI'10), Apr. 2010, pp. 11-20 (reprinted pp. 1-9), Springer-Verlag Berlin, Heidelberg.

Foster et al., "Managing Multiple Communication Methods in High-Performance Networked Computing Systems", Journal of Parallel and Distributed Computing, vol. 40, Issue 1, Jan. 1997, pp:1-25, (online publication), ScienceDirect.com, USA.

Robinson et al., "A Task Migration Implementation of the Message-Passing Interface", Proceedings of the 5th IEEE International Symposium on High Performance Distributed Computing (HPDC'96), May 1996, pp. 61-68, IEEE Computer Society, Washington DC, USA.

Final Office Action, U.S. Appl. No. 12/892,192, May 2, 2013, 1-25.
Office Action, U.S. Appl. No. 12/892,192, Sep. 30, 2013, 1-15.
Notice of Allowance, U.S. Appl. No. 13/007,860, Jul. 3, 2013, 1-8.
Office Action, U.S. Appl. No. 12/892,153, Apr. 25, 2013, 1-14.
Final Office Action, U.S. Appl. No. 12/892,153, Aug. 14, 2013, 1-9.
Office Action, U.S. Appl. No. 12/985,611, Aug. 2, 2013, 1-23.
Office Action, U.S. Appl. No. 13/007,848, May 15, 2013, 1-25.
Final Office Action, U.S. Appl. No. 13/007,848, Sep. 13, 2013, 1-24.
Notice of Allowance, U.S. Appl. No. 12/963,671, Sep. 18, 2013, 1-16.
Final Office Action, U.S. Appl. No. 12/940,198, Aug. 14, 2013, 1-16.
Final Office Action, U.S. Appl. No. 12/940,259, Aug. 14, 2013, 1-20.
Final Office Action, U.S. Appl. No. 12/940,282, Sep. 10, 2013, 1-17.
Notice of Allowance, U.S. Appl. No. 12/940,300, Apr. 29, 2013, 1-11.
Notice of Allowance, U.S. Appl. No. 12/963,694, Jun. 18, 2013, 1-21.
Office Action, U.S. Appl. No. 12/985,651, Aug. 5, 2013, 1-19.
Notice of Allowance, U.S. Appl. No. 13/290,670, Mar. 27, 2013, 1-19.
Notice of Allowance, U.S. Appl. No. 13/290,642, May 1, 2013, 1-24.
Office Action, U.S. Appl. No. 13/292,293, Jul. 19, 2013, 1-36.
Office Action, U.S. Appl. No. 13/659,370, Oct. 21, 2013, 1-22.
Final Office Action, U.S. Appl. No. 13/668,503, Jul. 11, 2013, 1-26.
Office Action, U.S. Appl. No. 13/671,762, May 13, 2013, 1-22.
Final Office Action, U.S. Appl. No. 13/671,762, Sep. 13, 2013, 1-21.
Office Action, U.S. Appl. No. 13/673,188, Jul. 25, 2013, 1-26.
Final Office Action, U.S. Appl. No. 13/678,799, Aug. 30, 2013, 1-17.
Final Office Action, U.S. Appl. No. 13/677,507, Aug. 22, 2013, 1-21.
Office Action, U.S. Appl. No. 13/676,700, Jun. 5, 2013, 1-31.
Office Action, U.S. Appl. No. 13/690,168, Aug. 15, 2013, 1-30.
Notice of Allowance, U.S. Appl. No. 13/681,903, Sep. 30, 2013, 1-18.
Office Action, U.S. Appl. No. 13/680,772, Aug. 15, 2013, 1-31.
Office Action, U.S. Appl. No. 13/710,066, Jul. 19, 2013, 1-36.
Notice of Allowance, U.S. Appl. No. 13/709,305, Aug. 27, 2013, 1-19.
Final Office Action, U.S. Appl. No. 13/711,108, Jul. 5, 2013, 1-34.
Notice of Allowance, U.S. Appl. No. 13/711,108, Sep. 19, 2013, 1-17.
Notice of Allowance, U.S. Appl. No. 13/784,198, Sep. 20, 2013, 1-11.
Final Office Action, U.S. Appl. No. 12/956,903, Nov. 6, 2013, 1-20.
Notice of Allowance, U.S. Appl. No. 13/292,293, Nov. 7, 2013, 1-20.
Notice of Allowance, U.S. Appl. No. 12/985,651, Feb. 20, 2014, pp. 1-14.
Notice of Allowance, U.S. Appl. No. 13/659,370, Mar. 13, 2014, pp. 1-15.

* cited by examiner

FENCING DATA TRANSFERS IN A PARALLEL ACTIVE MESSAGING INTERFACE OF A PARALLEL COMPUTER

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for fencing data transfers in a parallel active messaging interface (PAMI) of a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same application (split up and specially adapted) on multiple processors in order to obtain results faster. Parallel computing is based on the fact that the process of solving a problem usually can be divided into smaller jobs, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing jobs via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, an allgather.

One-sided message passing is a way to transmit information without active participation from a communications target, and FENCE instructions and protocols advise applications of completion of particular sequences of data communications instructions. Traditional FENCE protocols, however, are artifacts of application-level messaging modules, two-sided, inefficient, burdensome, difficult to implement. Existing FENCE protocols, for example, employ FENCE accounting with large counter arrays to guarantee the validity of FENCE operations. Readers will recognize that much of the usefulness of parallel operations, such as FENCE operations, is processing control on massively parallel machines, 'supercomputers,' with possibly thousands of compute nodes, millions of data communications endpoints each of which sends to all others, and therefore trillions of messages, so that such traditional FENCE accounting would require maintenance of huge counter arrays.

Parallel compute nodes, even in supercomputers, typically have limited on-board memory, so that large arrays of completion counters simply cannot scale. IBM's next-generation Blue Gene™ supercomputer, for example, supports on the order of a million communications endpoints, although each hardware process will have assigned to it only 250 MB of RAM, much too much of which would be occupied by any attempt at traditional FENCE accounting with counter arrays. Another inefficiency in traditional FENCE operations is that acknowledgement packets, even for one-sided operation, quickly lead to network congestion and poor one-sided latency, easily to be seen in a supercomputer setting with a few trillion messages in flight.

SUMMARY OF THE INVENTION

Methods, apparatus, and computer program products for fencing data transfers in a parallel active messaging interface (PAMI) of a parallel computer, the parallel computer including a plurality of compute nodes that execute a parallel application, the PAMI including data communications endpoints, each endpoint comprising a specification of data communications parameters for a thread of execution on a compute node, including specifications of a client, a context, and a task, the compute nodes coupled for data communications through the PAMI and through data communications resources including a deterministic data communications network through which data communications are delivered to target endpoints in the same order in which the communications are transmitted from origin endpoints, including initiating execution through the PAMI of an ordered sequence of active SEND instructions for SEND data transfers between two endpoints, a designated origin endpoint on an origin compute node and a designated target endpoint on a target compute node, each SEND instruction effecting a deterministic SEND data transfer, from the designated origin endpoint to the designated target endpoint, through the deterministic data communications network in which the SEND data transfers are effected according to the ordered sequence of the SEND instructions; and executing through the PAMI, with no FENCE accounting for SEND data transfers, an active FENCE instruction, the FENCE instruction completing execution only after completion of all SEND instructions initiated prior to execution of the FENCE instruction for SEND data transfers between the two endpoints.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
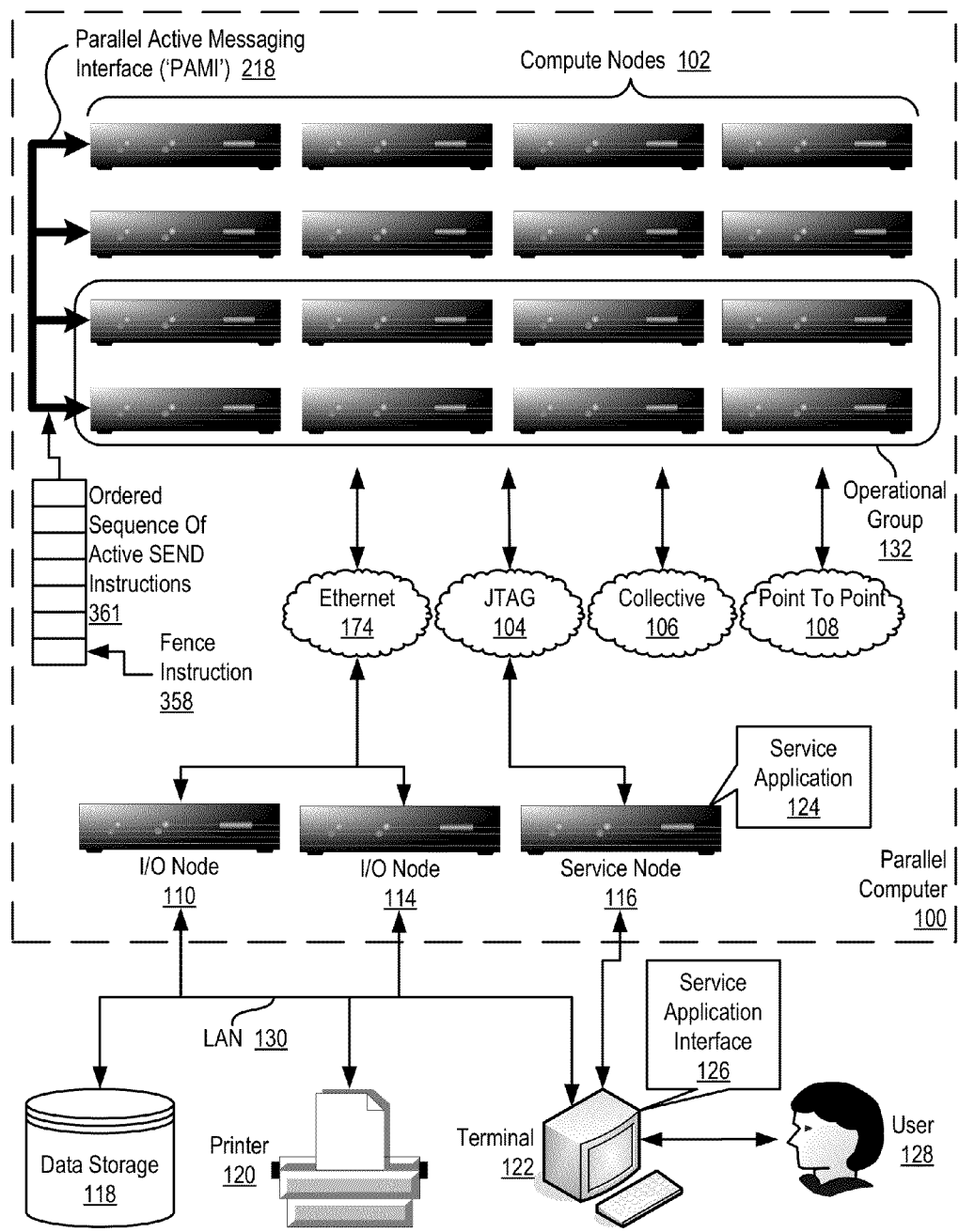
FIG. 1 sets forth a block and network diagram of an example parallel computer that fences data transfers in a parallel active messaging interface ('PAMI') according to embodiments of the present invention.

Example methods, computers, and computer program products for fencing data transfers in a parallel active messaging interface ('PAMI') according to embodiments of the present invention are described with reference to the accompanying drawings, beginning with FIG. 1. FIG. 1 sets forth a block and network diagram of an example parallel computer (100) that fences data transfers in a parallel active messaging interface ('PAMI') according to embodiments of the present invention. The parallel computer (100) in the example of FIG. 1 is coupled to non-volatile memory for the computer in the form of data storage device (118), an output device for the computer in the form of printer (120), and an input/output device for the computer in the form of computer terminal (122). The parallel computer (100) in the example of FIG. 1 includes a plurality of compute nodes (102).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a tree network (106) which is optimized for collective operations, and a torus network (108) which is optimized point to point operations. Tree network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operations for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art applications messaging module or parallel communications library, an application-level messaging module of computer program instructions for data communications on parallel computers. Such an application messaging module is disposed in an application messaging layer in a data communications protocol stack. Examples of prior-art parallel communications libraries that may be improved for use with parallel computers that fence data transfers in a PAMI according to embodiments of the present invention include IBM's MPI library, the 'Parallel Virtual Machine' ('PVM') library, MPICH, OpenMPI, and LAM/MPI. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Most collective operations are variations or combinations of four basic operations: broadcast, gather, scatter, and reduce. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. All processes specify the same receive count. The send arguments are only significant to the root process, whose buffer actually contains sendcount*N elements of a given datatype, where N is the number of processes in the given group of compute nodes. The send buffer will be divided equally and dispersed to all processes (including itself). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following predefined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the example parallel computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). Computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As the term is used here, a parallel active messaging interface or 'PAMI' (218) is a system-level messaging layer in a protocol stack of a parallel computer that is composed of data communications endpoints each of which is specified with data communications parameters for a thread of execution on a compute node of the parallel computer. The PAMI is a 'parallel' interface in that many instances of the PAMI operate in parallel on the compute nodes of a parallel computer. The PAMI is an 'active messaging interface' in that data communications messages in the PAMI are active messages, 'active' in the sense that such messages implement callback functions to advise of message dispatch and instruction completion and so on, thereby reducing the quantity of acknowledgment traffic and the like burdening the data communication resources of the PAMI.

Each data communications endpoint of a PAMI is implemented as a combination of a client, a context, and a task. A 'client' as the term is used in PAMI operations is a collection of data communications resources dedicated to the exclusive use of an application-level data processing entity, an application or an application messaging module such as an MPI library. A 'context' as the term is used in PAMI operations is composed of a subset of a client's collection of data processing resources, context functions, and a work queue of data transfer instructions to be performed by use of the subset through the context functions operated by an assigned thread of execution. In at least some embodiments, the context's subset of a client's data processing resources is dedicated to the exclusive use of the context. A 'task' as the term is used in PAMI operations refers to a process of execution for the parallel application. That is, a task is typically implemented as an identifier of a particular instance of an application executing on a compute node, a compute core on a compute node, or a thread of execution on a multi-threading compute core on a compute node.

In the example of FIG. 1, the compute nodes (102) are coupled for data communications through a PAMI (218) and through data communications resources that include a deterministic data communications network (108), in this example, the Point To Point network (108). That is, at least the Point To Point network, which is typically implemented as a torus or mesh, effects deterministic data communications among PAMI endpoints on the compute nodes. Deterministic data communications are data communications that are delivered to target endpoints in the same order in which the communications are transmitted from origin endpoints. Such a network can be configured for deterministic operations in a number of ways. The network can be configured with routing information, tables or parameters, that specify and require communications between any two particular endpoints always to use exactly the same route through the network; in this way, any transmissions between those two endpoints will always be delivered to the target endpoint in exactly the same order in which the communications were injected into the network from the origin endpoint. Alternatively, adapters, switches, and routers of the network can be configured to administer sequence numbers in packet headers or frame headers so that the network itself enforces sequencing regardless of the route through the network for any particular packet or frame. Very likely other ways of implementing deterministic networks will occur to those of skill in the art, and all such ways are well within the scope of the present invention.

The parallel computer of FIG. 1 operates generally for fencing data transfers in a PAMI by initiating execution through the PAMI (218) of an ordered sequence of active SEND instructions (361) for SEND data transfers between two endpoints, a designated origin endpoint on an origin compute node and a designated target endpoint on a target compute node. The origin endpoint and the target endpoint can be any two endpoints on any of the compute nodes (102); they are said to be 'designated' in that the ordered sequence of send instructions result in data transfers between two specific endpoints, an origin and a target. The SEND instructions are 'active' in the sense that the SEND instructions implement callback functions to advise of instruction dispatch and instruction completion, thereby reducing the quantity of acknowledgment traffic required on the network. Each such SEND instruction effects a deterministic SEND data transfer, from the designated origin endpoint to the designated target endpoint, through the deterministic data communications network (108)—where the SEND data transfers are effected according to the ordered sequence of the SEND instructions—because the deterministic network, as mentioned, delivers data communications to target endpoints in the same order in which the communications are transmitted from origin endpoints.

The parallel computer of FIG. 1 operates generally also for fencing data transfers in the PAMI (218) by executing through the PAMI, with no FENCE accounting for SEND data transfers, an active FENCE instruction (358). The FENCE instruction is directed specifically to SEND instructions between two particular endpoints, and the FENCE instruction completes execution only after completion of all SEND instructions initiated prior to execution of the FENCE instruction for SEND data transfers between the two endpoints.

The arrangement of compute nodes, networks, and I/O devices making up the example parallel computer illustrated in FIG. 1 are for explanation only, not for limitation of the present invention. Parallel computers capable of fencing data transfers in a PAMI according to embodiments of the present invention may include additional nodes, networks, devices, and architectures, not shown in FIG. 1, as will occur to those of skill in the art. The parallel computer (100) in the example of FIG. 1 includes sixteen compute nodes (102); parallel computers capable of fencing data transfers in a PAMI according to embodiments of the present invention sometimes include thousands of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Fencing data transfers in a PAMI according to embodiments of the present invention is generally implemented on a parallel computer that includes a plurality of compute nodes. In fact, such computers may include thousands of such compute nodes. Each compute node is in turn itself a computer composed of one or more computer processors, its own computer memory, and its own input/output ('I/O') adapters. For further explanation, therefore, FIG. 2 sets forth a block diagram of an example compute node useful in a parallel computer that fences data transfers in a parallel active messaging interface ('PAMI') according to embodiments of the present invention. The compute node (152) of FIG. 2 includes one or more computer processors (164) as well as random access memory ('RAM') (156). Each processor (164) can support multiple hardware compute cores (165), and each such core can in turn support multiple threads of execution. The processors (164) are connected to RAM (156) through a high-speed memory bus (154) and through a bus adapter (194) and a extension bus (168) to other components of the compute node. Stored in RAM (156) is an application program (158), a module of computer program instructions that carries out parallel, user-level data processing using parallel algorithms.

Also stored RAM (156) is an application messaging module (216), a library of computer program instructions that carry out application-level parallel communications among compute nodes, including point to point operations as well as collective operations. Although the application program can call PAMI routines directly, the application program (158) often executes point-to-point data communications operations by calling software routines in the application messaging module (216), which in turn is improved according to embodiments of the present invention to use PAMI functions to implement such communications. An application messaging module can be developed from scratch to use a PAMI according to embodiments of the present invention, using a traditional programming language such as the C programming language or C++, for example, and using traditional programming methods to write parallel communications routines that send and receive data among nodes through data communications networks or shared-memory transfers. In this approach, the application messaging module (216) exposes a traditional interface, such as MPI, to the application program (158) so that the application program can gain the benefits of a PAMI with no need to recode the application. As an alternative to coding from scratch, therefore, existing prior art application messaging modules may be improved to use the PAMI, existing modules that already implement a traditional interface. Examples of prior-art application messaging modules that can be improved to FENCE with a PAMI according to embodiments of the present invention include such parallel communications libraries as the traditional 'Message Passing Interface' ('MPI') library, the 'Parallel Virtual Machine' ('PVM') library, MPICH, and the like.

Figure 2:
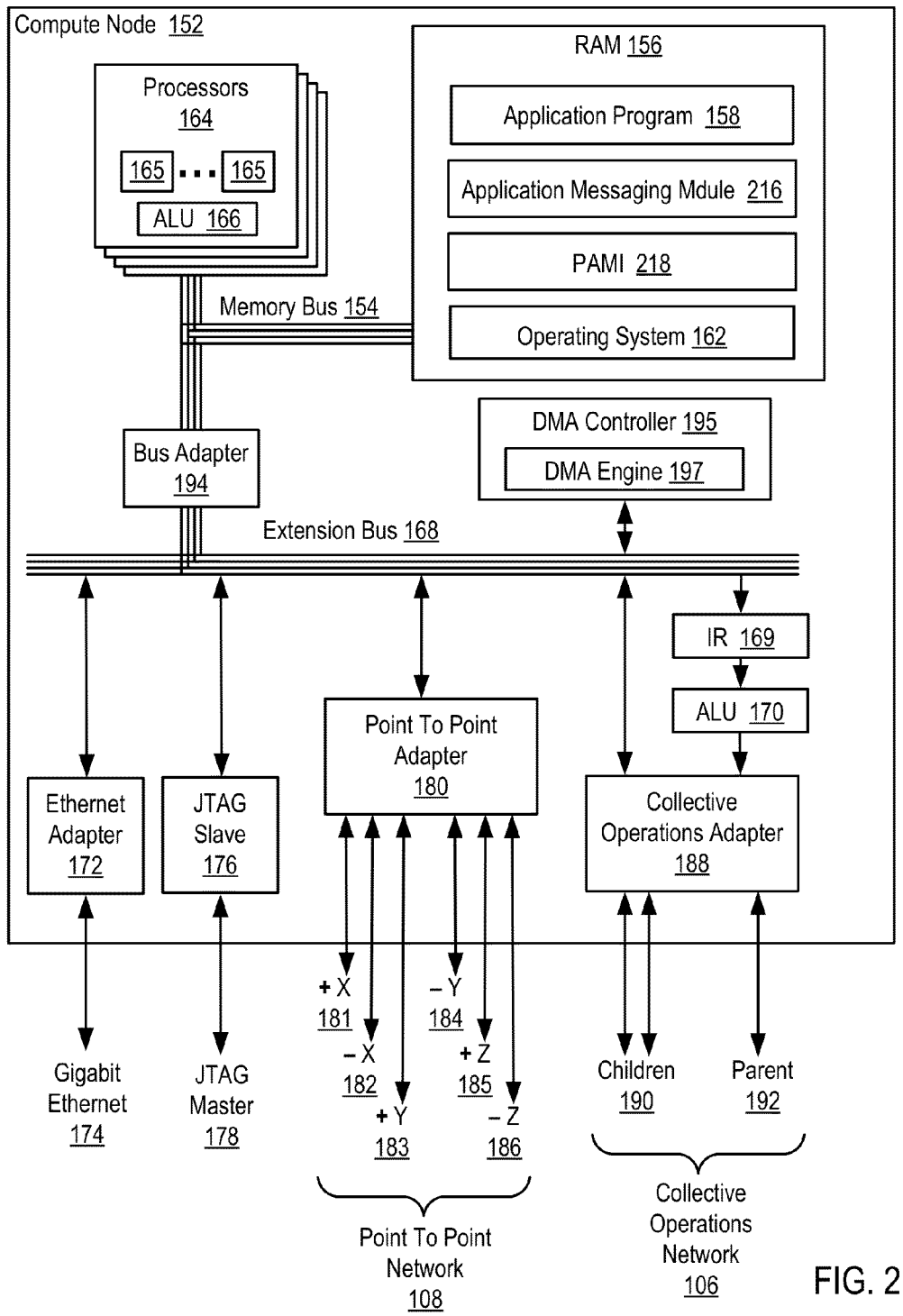
FIG. 2 sets forth a block diagram of an example compute node useful in parallel computers that fence data transfers in a PAMI according to embodiments of the present invention.

Also represented in RAM in the example of FIG. 2 is a PAMI (218). Readers will recognize, however, that the representation of the PAMI in RAM is a convention for ease of explanation rather than a limitation of the present invention, because the PAMI and its components, endpoints, clients, contexts, and so on, have particular associations with hardware data communications resources. In fact, the PAMI can be implemented partly as software or firmware and hardware—or even entirely in hardware, in some embodiments at least.

Also stored in RAM (156) is an operating system (162), a module of computer program instructions and routines for an application program's access to other resources of the compute node. It is possible for an application program, an application messaging module, and a PAMI in a compute node of a parallel computer to run threads of execution with no user login and no security issues because each such thread is entitled to complete access to all resources of the node. The quantity and complexity of tasks to be performed by an operating system on a compute node in a parallel computer therefore can be somewhat smaller and less complex than those of an operating system on a serial computer with many threads running simultaneously with various level of authorization for access to resources. In addition, there is no video I/O on the compute node (152) of FIG. 2, another factor that decreases the demands on the operating system. The operating system may therefore be quite lightweight by comparison with operating systems of general purpose computers, a pared down or 'lightweight' version as it were, or an operating system developed specifically for operations on a particular parallel computer. Operating systems that may usefully be improved or simplified for use in a compute node according to embodiments of the present invention include UNIX™, Linux™, Microsoft XP™, AIX™, IBM's i5/OS™, and others as will occur to those of skill in the art.

The example compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in computers that fence data transfers in a parallel active messaging interface ('PAMI') according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in fencing data transfers in a PAMI according to embodiments of the present invention.

The data communications adapters in the example of FIG. 2 includes a Point To Point Adapter (180) that couples example compute node (152) for data communications to a deterministic data communications network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186). For ease of explanation, the Point To Point Adapter (180) of FIG. 2 as illustrated is configured for data communications in three dimensions, x, y, and z, but readers will recognize that Point To Point Adapters optimized for deterministic point-to-point operations in fencing data transfers in a PAMI of a parallel computer according to embodiments of the present invention may in fact be implemented so as to support communications in two dimensions, four dimensions, five dimensions, and so on.

The data communications adapters in the example of FIG. 2 includes a Collective Operations Adapter (188) that couples example compute node (152) for data communications to a network (106) that is optimal for collective message passing operations such as, for example, a network configured as a binary tree. Collective Operations Adapter (188) provides data communications through three bidirectional links: two to children nodes (190) and one to a parent node (192).

The example compute node (152) includes two arithmetic logic units ('ALUs'). ALU (166) is a component of a processor (164), and a separate ALU (170) is dedicated to the exclusive use of collective operations adapter (188) for use in performing the arithmetic and logical functions of reduction operations. Computer program instructions of a reduction routine in an application messaging module (216) or a PAMI (218) may latch an instruction for an arithmetic or logical function into instruction register (169). When the arithmetic or logical function of a reduction operation is a 'sum' or a 'logical OR,' for example, collective operations adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), a module of logic circuitry configured to accept DMA instructions and operate a DMA engine to carry them out, and a DMA engine (195), which is a module of automated computing machinery that implements, through communications with other DMA engines on other compute nodes, direct memory access to and from memory on its own compute node and memory on other the compute nodes. Direct memory access is a way of reading and writing to memory of compute nodes with reduced operational burden on the central processing units (164); a CPU initiates a DMA transfer, but the CPU does not execute the DMA transfer. A DMA transfer essentially copies a block of memory from one compute node to another, from an origin to a target for a PUT operation, from a target to an origin for a GET operation. The DMA engine (195) of FIG. 2 is configured to carry out DMA operations by transmitting to other DMA engines request to send ('RTS') messages, receiving from other DMA engines RTS messages, preparing to store data, sending acknowledgments that the DMA engine is prepared to receive a data transmission from other DMA engines; receiving such acknowledgements from another DMA engine, and transferring data to or from data storage on another compute node using DMA PUT and GET operations.

Figure 3A:
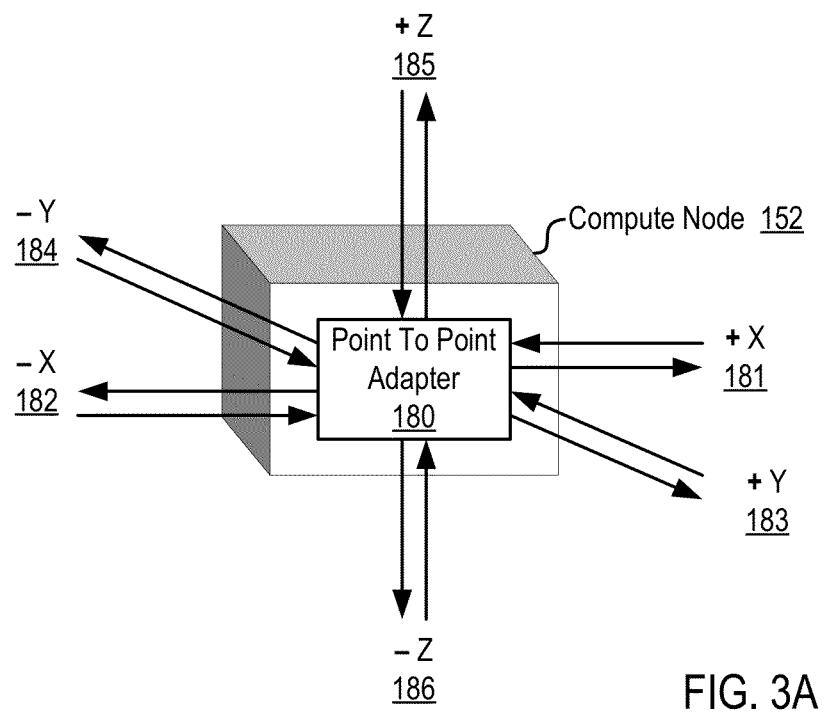
FIG. 3A illustrates an example Point To Point Adapter useful in parallel computers that fence data transfers in a PAMI according to embodiments of the present invention.

For further explanation, FIG. 3A illustrates an example of a Point To Point Adapter (180) useful in parallel computers that fence data transfers in a PAMI according to embodiments of the present invention. Point To Point Adapter (180) is designed for use in a deterministic data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in also provides data communication along a z-axis through four unidirectional data communications links, to and from the next node in the −z direction (186) and to and from the next node in the +z direction (185). For ease of explanation, the Point To Point Adapter (180) of FIG. 3A as illustrated is configured for data communications in only three dimensions, x, y, and z, but readers will recognize that Point To Point Adapters optimized for deterministic point-to-point operations in fencing data transfers in a PAMI of a parallel computer according to embodiments of the present invention may in fact be implemented so as to support communications in two dimensions, four dimensions, five dimensions, and so on. Several supercomputers now use five dimensional mesh or torus networks, including, for example, IBM's Blue Gene Q™.

Figure 3B:
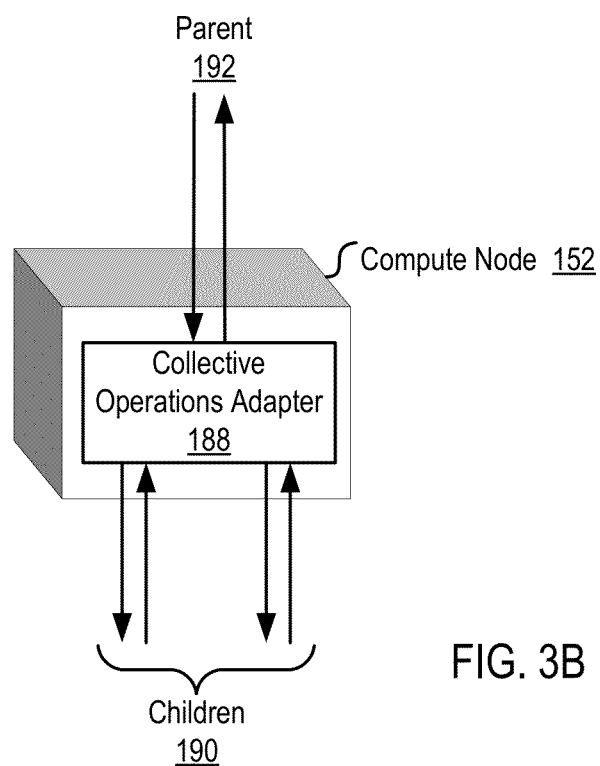
FIG. 3B illustrates an example Collective Operations Adapter useful in parallel computers that fence data transfers in a PAMI according to embodiments of the present invention.

For further explanation, FIG. 3B illustrates an example of a Collective Operations Adapter (188) useful in a parallel computer that fences data transfers in a PAMI according to embodiments of the present invention. Collective Operations Adapter (188) is designed for use in a network optimized for collective operations, a network that organizes compute nodes of a parallel computer in a binary tree. Collective Operations Adapter (188) in the example of FIG. 3B provides data communication to and from two children nodes through four unidirectional data communications links (190). Collective Operations Adapter (188) also provides data communication to and from a parent node through two unidirectional data communications links (192).

Figure 4:
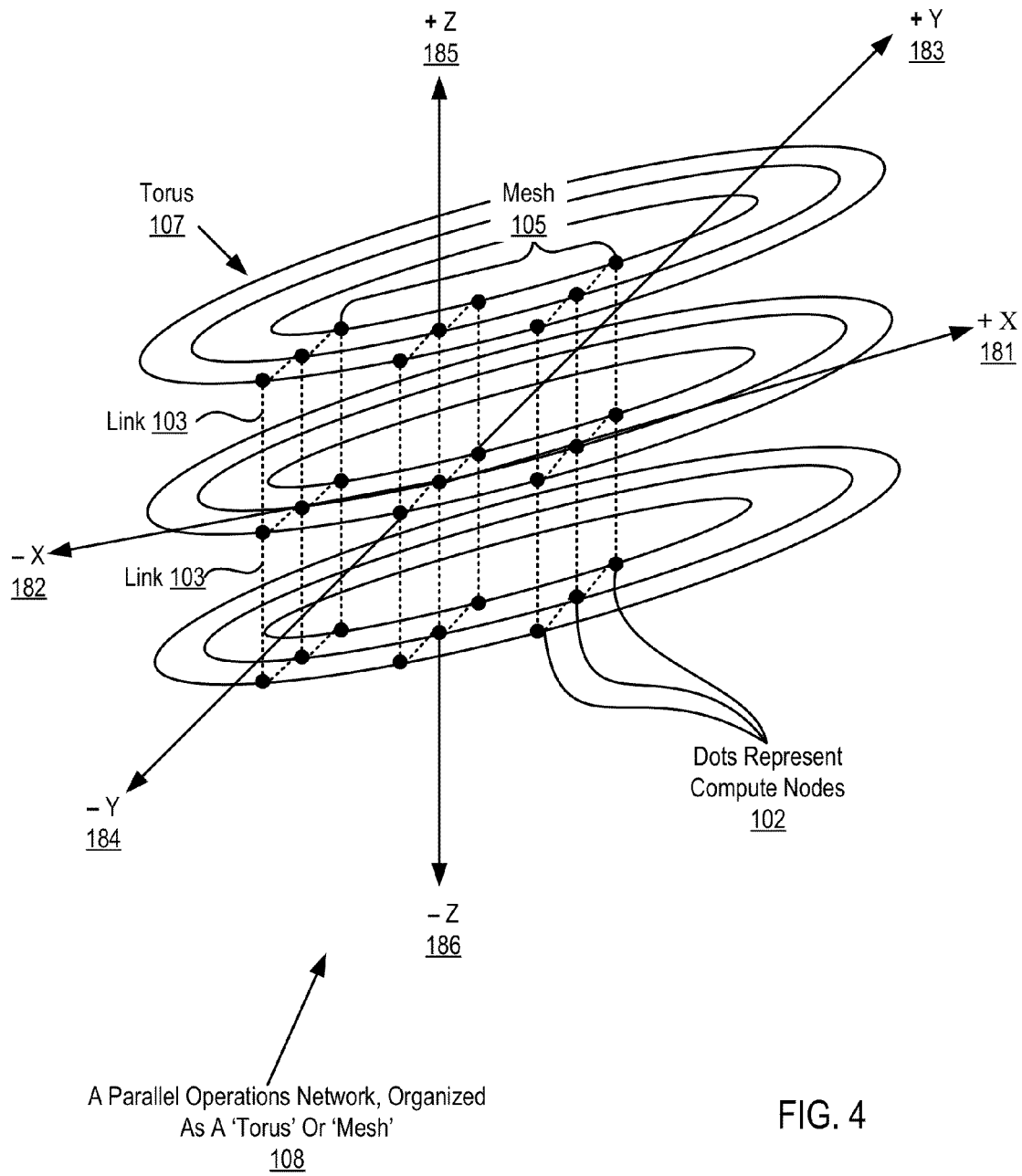
FIG. 4 illustrates an example data communications network optimized for point to point operations and useful in parallel computers that fence data transfers in a PAMI according to embodiments of the present invention.

For further explanation, FIG. 4 sets forth a line drawing illustrating an example data communications network (108) optimized for point-to-point operations useful in parallel computers that fence data transfers in a PAMI according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in fencing data transfers in a PAMI of a parallel computer in accordance with embodiments of the present invention may contain only a few compute nodes or may contain thousands of compute nodes. For ease of explanation, the data communications network of FIG. 4 is illustrated with only three dimensions, but readers will recognize that a data communications network optimized for point-to-point operations for use in fencing data transfers in a PAMI of a parallel computer according to embodiments of the present invention may in fact be implemented in two dimensions, four dimensions, five dimensions, and so on. As mentioned, several supercomputers now use five dimensional mesh or torus networks, including IBM's Blue Gene Q™.

Figure 5:
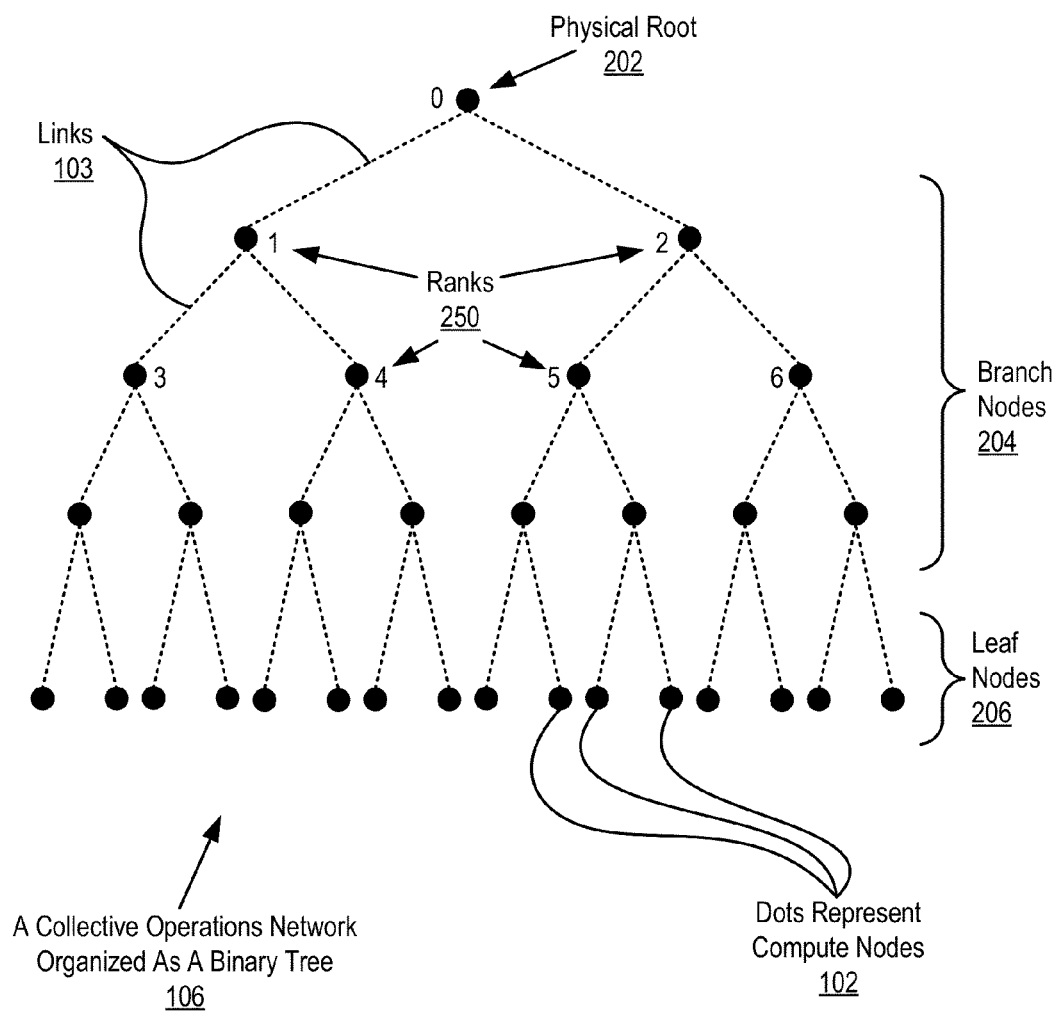
FIG. 5 illustrates an example data communications network optimized for collective operations by organizing compute nodes in a tree and useful in parallel computers that fence data transfers in a PAMI according to embodiments of the present invention.

For further explanation, FIG. 5 illustrates an example data communications network (106) optimized for collective operations by organizing compute nodes in a tree. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with collective operations data communications adapters similar to the one illustrated for example in FIG. 3B, with each node typically providing data communications to and from two children nodes and data communications to and from a parent node, with some exceptions. Nodes in a binary tree may be characterized as a root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in parallel computers that fence data transfers in a PAMI according to embodiments of the present invention may contain only a few compute nodes or hundreds or thousands of compute nodes.

In the example of FIG. 5, each node in the tree is assigned a unit identifier referred to as a 'rank' (250). The rank actually identifies an instance of a parallel application that is executing on a compute node. That is, the rank is an application-level identifier. Using the rank to identify a node assumes that only one such instance of an application is executing on each node. As mentioned, a compute node can support multiple processors, each of which can support multiple processing cores— so that more than one process or instance of an application can easily be present under execution on any given compute node—or in all the compute nodes, for that matter. To the extent that more than one instance of an application executes on a single compute node, the rank identifies the instance of the application as such rather than the compute node. A rank uniquely identifies an application's location in the tree network for use in both point-to-point and collective operations in the tree network. The ranks in this example are assigned as integers beginning with '0' assigned to the root instance or root node (202), '1' assigned to the first node in the second layer of the tree, '2' assigned to the second node in the second layer of the tree, '3' assigned to the first node in the third layer of the tree, '4' assigned to the second node in the third layer of the tree, and so on. For ease of illustration, only the ranks of the first three layers of the tree are shown here, but all compute nodes, or rather all application instances, in the tree network are assigned a unique rank. Such rank values can also be assigned as identifiers of application instances as organized in a mesh or torus network.

Figure 6:
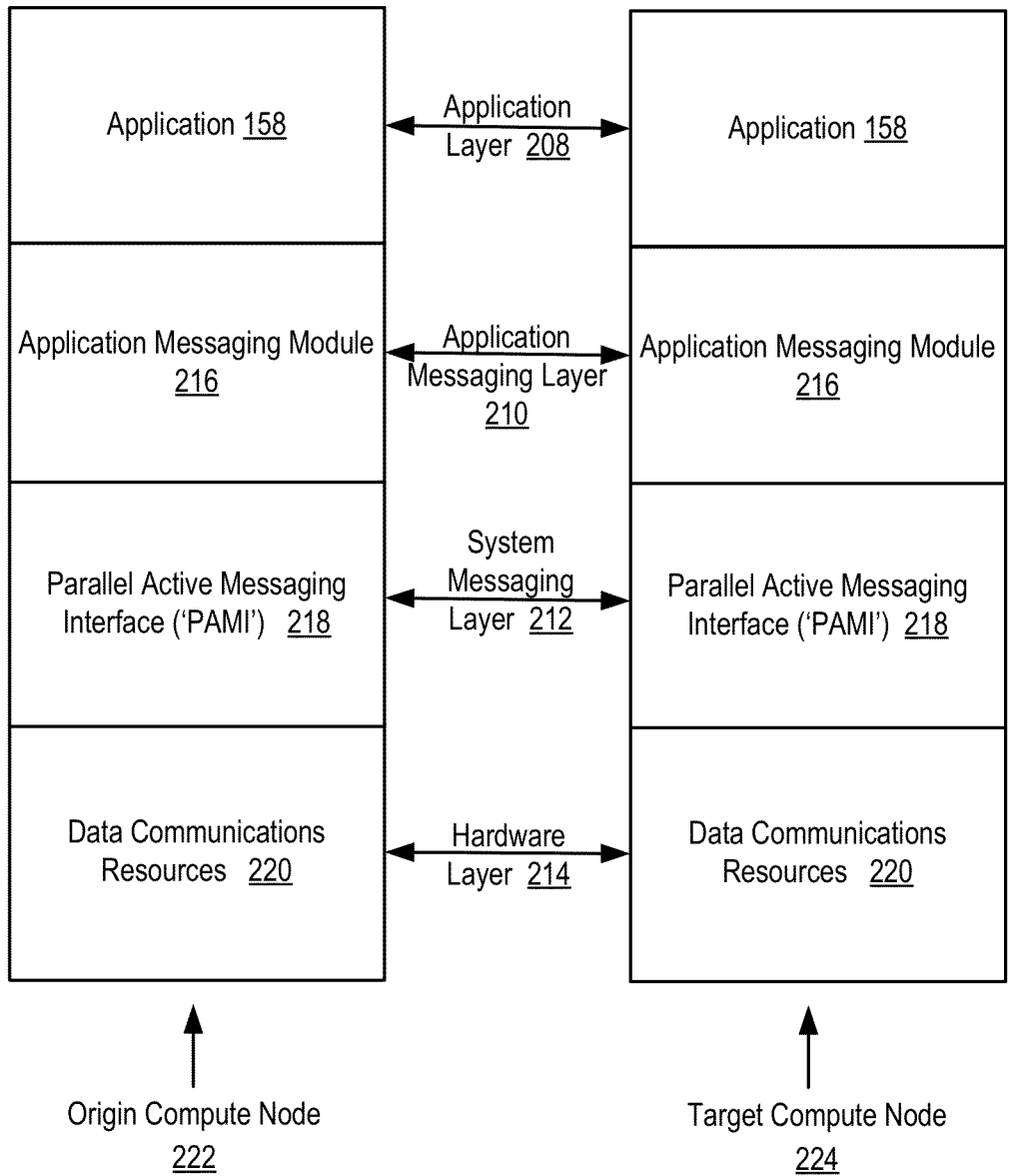
FIG. 6 sets forth a block diagram of an example protocol stack useful in parallel computers that fence data transfers in a PAMI according to embodiments of the present invention.

For further explanation, FIG. 6 sets forth a block diagram of an example protocol stack useful in parallel computers that fence data transfers in a PAMI according to embodiments of the present invention. The example protocol stack of FIG. 6 includes a hardware layer (214), a system messaging layer (212), an application messaging layer (210), and an application layer (208). For ease of explanation, the protocol layers in the example stack of FIG. 6 are shown connecting an origin compute node (222) and a target compute node (224). The granularity of connection through the system messaging layer (212), which is implemented with a PAMI (218), however, is finer than merely compute node to compute node. Readers will recognize that the PAMI connects endpoints, connections specified by clients, contexts, and tasks each such being specific to a thread of execution on a compute node, with each compute node capable of supporting many threads and therefore many endpoints. Every endpoint typically can function as both an origin endpoint or a target endpoint for data transfers through a PAMI, and both the origin endpoint and its target endpoint can be located on the same compute node. So an origin compute node (222) and its target compute node (224) can in fact be the same compute node.

The application layer (208) provides communications between instances of a parallel application (158) running on the compute nodes (222, 224) by invoking functions in an application messaging module (216) installed on each compute node. Communications among instances of the application through messages passed between the instances of the application. Applications may communicate messages invoking function of an application programming interface ('API') exposed by the application messaging module (216). In this approach, the application messaging module (216) exposes a traditional interface, such as an API of an MPI library, to the application program (158) so that the application program can gain the benefits of a PAMI, reduced network traffic, callback functions, and so on, with no need to recode the application. Alternatively, if the parallel application is programmed to use PAMI functions, the application can call the PAMI functions directly, without going through the application messaging module.

The example protocol stack of FIG. 6 includes a system messaging layer (212) implemented here as a PAMI (218). The PAMI provides system-level data communications functions that support messaging in the application layer (602) and the application messaging layer (610). Such system-level functions are typically invoked through an API exposed to the application messaging modules (216) in the application messaging layer (210). Although developers can in fact access a PAMI API directly by coding an application to do so, a PAMI's system-level functions in the system messaging layer (212) in many embodiments are isolated from the application layer (208) by the application messaging layer (210), making the application layer somewhat independent of system specific details. With an application messaging module presenting a standard MPI API to an application, for example, with the application messaging module retooled to use PAMI to carry out the low-level messaging functions, the application gains the benefits of a PAMI with no need to incur the expense of reprogramming the application to call the PAMI directly. Because, however, some applications will in fact be reprogrammed to call the PAMI directly, all entities in the protocol stack above the PAMI are viewed by the PAMI as applications. When PAMI functions are invoked by entities above the PAMI in the stack, the PAMI makes no distinction whether the caller is in the application layer or the application messaging layer, no distinction whether the caller is an application as such or an MPI library function invoked by an application. As far as the PAMI is concerned, any caller of a PAMI function is an application.

The protocol stack of FIG. 6 includes a hardware layer (634) that defines the physical implementation and the electrical implementation of aspects of the hardware on the compute nodes such as the bus, network cabling, connector types, physical data rates, data transmission encoding and many other factors for communications between the compute nodes (222) on the physical network medium. In many PAMI installations, the hardware layer will also include DMA resources as well as shared memory transfer capabilities.

Figure 7:
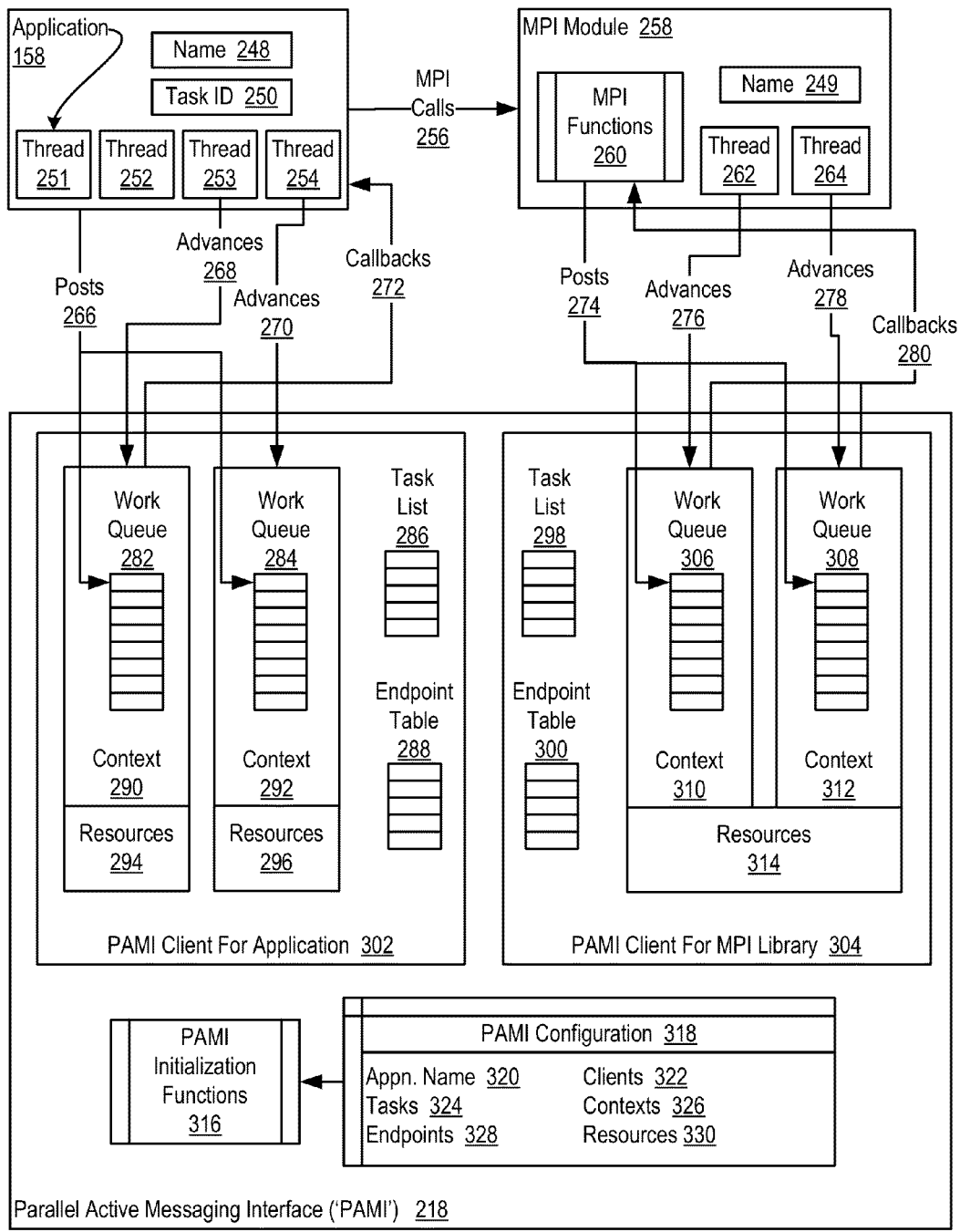
FIG. 7 sets forth a functional block diagram of example data communications resources useful in parallel computers that fence data transfers in a PAMI according to embodiments of the present invention.

For further explanation, FIG. 7 sets forth a functional block diagram of an example PAMI useful in parallel computers that fence data transfers in a PAMI according to embodiments of the present invention. The PAMI provides an active messaging layer that supports both point to point communications in a mesh or torus as well as collective operations, gathers, reductions, barriers, and the like in tree networks, for example. The PAMI is a multithreaded parallel communications engine designed to provide low level message passing functions, many of which are one-sided, and abstract such functions for higher level messaging middleware, referred to in this specification as applications messaging modules in an application messaging layer. In the example of FIG. 7, the application messaging layer is represented by a generic MPI module (258), appropriate for ease of explanation because some form of MPI is a de facto standard for such messaging middleware. Compute nodes of a parallel computer (100, 102 on FIG. 1) are coupled for data communications through such a PAMI and through data communications resources (294, 296, 314) that include a deterministic data communications network through which data communications are delivered to target endpoints in the same order in which the communications are transmitted from origin endpoints. The PAMI provides data communications among data communications endpoints, where each endpoint is specified by data communications parameters for a thread of execution on a compute node, including specifications of a client, a context, and a task.

Figure 9:
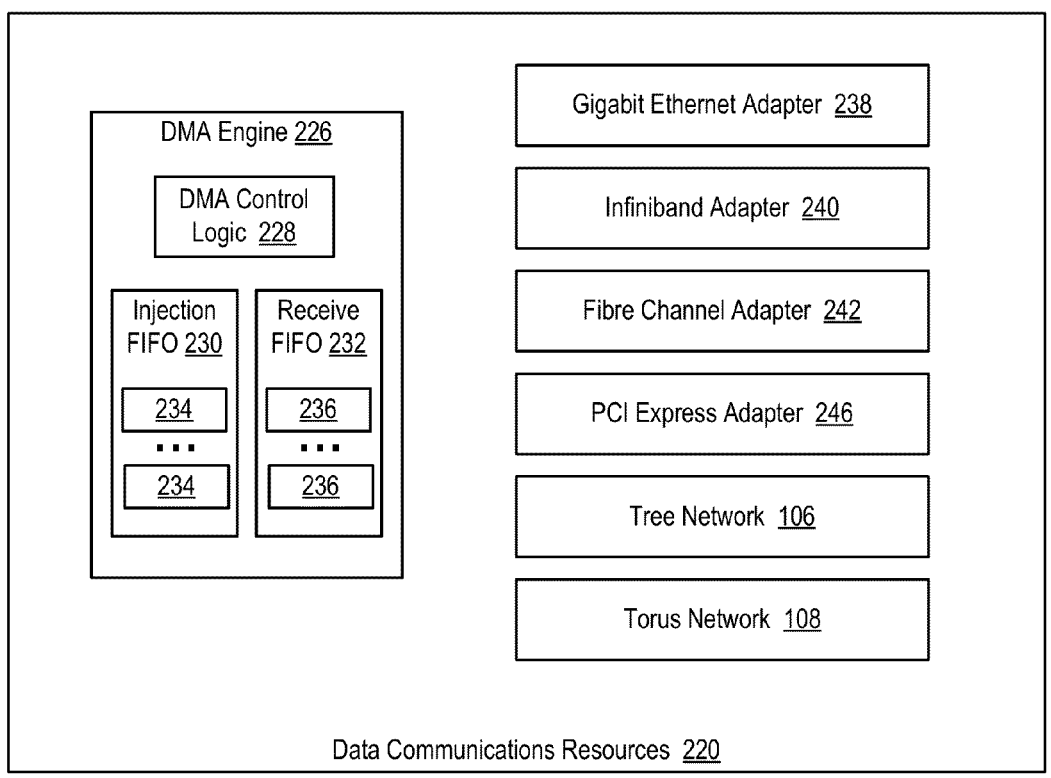
FIG. 9 sets forth a functional block diagram of example endpoints useful in parallel computers that fence data transfers in a PAMI according to embodiments of the present invention.

The PAMI (218) in this example includes PAMI clients (302, 304), tasks (286, 298), contexts (190, 292, 310, 312), and endpoints (288, 300). A PAMI client is a collections is a collection of data communications resources (294, 295, 314) dedicated to the exclusive use of an application-level data processing entity, an application or an application messaging module such as an MPI library. Data communications resources to be assigned in collections to PAMI clients are explained in more detail with reference to FIG. 9. FIG. 9 sets forth a functional block diagram of example data communications resources (220) useful in parallel computers that fence data transfers in a PAMI according to embodiments of the present invention. The data communications resources in the example of FIG. 9 include a DMA engine (226) with DMA control logic (228), an injection FIFO (230), and a receive FIFO (232). The data communications resources of FIG. 9 also include a gigabit Ethernet adapter (238), an Infiniband adapter (240), a Fibre Channel adapter (242), a PCI Express adapter (246), a collective operations network configured as a tree (106), and a point to point network configured as a torus or mesh (108). A PAMI is configured with clients, each of which is in turn configured with certain collections of such data communications resources—so that, for example, the PAMI client (302) in the PAMI (218) in the example of FIG. 7 can have dedicated to its use a collection of data communications resources composed of six Gigabit Ethernet adapters (238) and six Infiniband adapters (240). And the PAMI client (304) can have dedicated to its use six Fibre Channel adapters (242) and a torus network (108). And so on.

Figure 8:
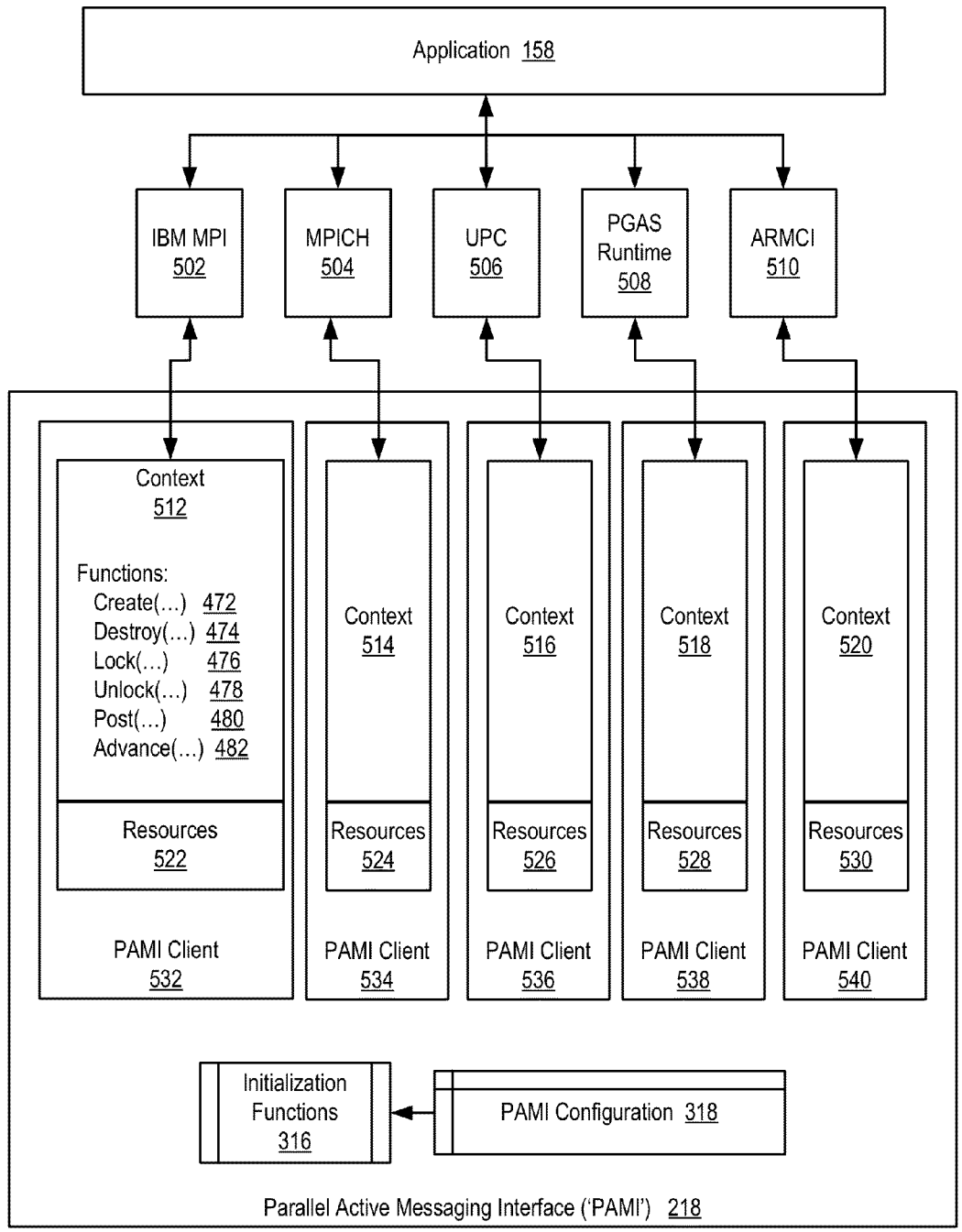
FIG. 8 sets forth a functional block diagram of an example PAMI useful in parallel computers that fence data transfers in a PAMI according to embodiments of the present invention.

PAMI clients enable higher level middleware, application messaging modules, MPI libraries, and the like, to be developed independently so that each can be used concurrently by an application. Although the application messaging layer in FIG. 7 is represented for example by a single generic MPI module (258), in fact, the PAMI, using multiple clients, can support multiple message passing libraries or application messaging modules simultaneously, a fact that is explained in more detail with reference to FIG. 8. FIG. 8 sets forth a functional block diagram of an example PAMI useful in parallel computers that fence data transfers in a PAMI according to embodiments of the present invention in which the example PAMI operates, on behalf of an application (158), with multiple application messaging modules simultaneously. The application (158) can have multiple messages in transit simultaneously through each of the application messaging modules (502-510). Each context (512-520) carries out, through post and advance functions, data communications for the application on data communications resources in the exclusive possession, in each client, of that context. Each context carries out data communications operations independently and in parallel with other contexts in the same or other clients. In the example FIG. 8, each client (532-540) includes a collection of data communications resources (522-530) dedicated to the exclusive use of an application-level data processing entity, one of the application messaging modules (502-510):

- IBM MPI Library (502) operates through context (512) data communications resources (522) dedicated to the use of PAMI client (532),
- MPICH Library (504) operates through context (514) data communications resources (524) dedicated to the use of PAMI client (534),
- Unified Parallel C ('UPC') Library (506) operates through context (516) data communications resources (526) dedicated to the use of PAMI client (536),
- Partitioned Global Access Space ('PGAS') Runtime Library (508) operates through context (518) data communications resources (528) dedicated to the use of PAMI client (538), and
- Aggregate Remote Memory Copy Interface ('ARMCI') Library (510) operates through context (520) data communications resources (530) dedicated to the use of PAMI client (540).

Again referring to the example of FIG. 7: The PAMI (218) includes tasks, listed in task lists (286, 298) and identified (250) to the application (158). A 'task' as the term is used in PAMI operations is a platform defined integer datatype that identifies a canonical application process, an instance of a parallel application (158). Very carefully in this specification, the term 'task' is always used to refer only to this PAMI structure, not the traditional use of the computer term 'task' to refer to a process or thread of execution. In this specification, the term 'process' refers to a canonical data processing process, a container for threads in a multithreading environment. In particular in the example of FIG. 7, the application (158) is implemented as a canonical process with multiple threads (251-254) assigned various duties by a leading thread (251) which itself executes an instance of a parallel program. Each instance of a parallel application is assigned a task; each task so assigned can be an integer value, for example, in a C environment, or a separate task object in a C++ or Java environment. The tasks are components of communications endpoints, but are not themselves communications endpoints; tasks are not addressed directly for data communications in PAMI. This gives a finer grained control than was available in prior message passing art. Each client has its own list (286, 298) of tasks for which its contexts provide services; this allows each process to potentially reside simultaneously in two or more different communications domains as will be the case in certain advanced computers using, for example, one type of processor and network in one domain and an completely different processor type and network in another domain, all in the same computer.

The PAMI (218) includes contexts (290, 292, 310, 312). A 'context' as the term is used in PAMI operations is composed of a subset of a client's collection of data processing resources, context functions, and a work queue of data transfer instructions to be performed by use of the subset through the context functions operated by an assigned thread of execution. That is, a context represents a partition of the local data communications resources assigned to a PAMI client. Every context within a client has equivalent functionality and semantics. Context functions implement contexts as threading points that applications use to optimize concurrent communications. Communications initiated by a local process, an instance of a parallel application, uses a context object to identify the specific threading point that will be used to issue a particular communication independent of communications occurring in other contexts. In the example of FIG. 7, where the application (158) and the application messaging module (258) are both implemented as canonical processes with multiple threads of execution, each has assigned or mapped particular threads (253, 254, 262, 264) to advance (268, 270, 276, 278) work on the contexts (290, 292, 310, 312), including execution of local callbacks (272, 280). In particular, the local event callback functions (272, 280) associated with any particular communication are invoked by the thread advancing the context that was used to initiate the communication operation in the first place. Like PAMI tasks, contexts are not used to directly address a communication destination or target, as they are a local resource.

Functions on a context, post, advance, and so on, are critical sections, not guaranteed to be thread safe. Applications must somehow ensure that critical sections are protected from re-entrant use. Applications can use mutual exclusion locks to protect critical sections. Or, to the extent that progress is driven independently on a context by a single thread of execution, then no mutual exclusion locking of the context itself is required—provided that no other thread ever attempts to call a function on such a context. Progress can be driven with advance functions concurrently among multiple context, by using multiple threads, as desired by an application—shown here by threads (253, 254, 262, 264) which advance work concurrently, independently and in parallel, on contexts (290, 292, 310, 312).

Context functions, explained here with regard to references (472-482) on FIG. 8, include functions to create (472) and destroy (474) contexts, functions to lock (476) and unlock (478) access to a context, and functions to post (480) and advance (480) work in a context. For ease of explanation, the context functions (472-482) are illustrated in only one expanded context (512); readers will understand, however, that all PAMI contexts have similar context functions. The create (472) and destroy (474) functions are, in an object-oriented sense, constructors and destructors. In the example embodiments described in this specifications, post (480) and advance (482) functions on a context are critical sections, not thread safe. Applications must somehow ensure that critical sections are protected from re-entrant use. Applications can use mutual exclusion locks to protect critical sections. The lock (476) and unlock (478) functions in the example of FIG. 8 provide and operate such a mutual exclusion lock to protect the critical sections in the post (480) and advance (482) functions. If only a single thread posts or advances work on a context, then that thread need never lock that context. To the extent that progress is driven independently on a context by a single thread of execution, then no mutual exclusion locking of the context itself is required—provided that no other thread ever attempts to call a function on such a context. If more than one thread will post or advance work on a context, each such thread must secure a lock before calling a post or an advance function on that context. This is one reason why it is probably a preferred architecture, given sufficient resources, to assign one thread to operate each context. Progress can be driven with advance (482) functions concurrently among multiple contexts by using multiple threads, as desired by an application—shown in the example of FIG. 7 by threads (253, 254, 262, 264) which advance work concurrently, independently and in parallel, on contexts (290, 292, 310, 312).

Posts and advances (480, 482 on FIG. 8) are functions called on a context, either in a C-type function with a context ID as a parameter, or in object oriented practice where the calling entity possesses a reference to a context or a context object as such and the posts and advances are member methods of a context object. Again referring to FIG. 7: Application-level entities, application programs and application messaging modules, post (266, 274) data communications instructions to the work queues (282, 284, 306, 308) in contexts and then call advance functions (268, 270, 276, 278) on the contexts to progress specific data processing and data communications that carry out the instructions. The data processing and data communications comprising the advance functions include specific messages, request to send ('RTS') and acknowledgments, callback execution, transfers of payload data, and so on. Advance functions therefore operate generally by checking a work queue for any new instructions that need to be initiated and checking data communications resources for any incoming message traffic that needs to be administered, with callbacks and the like. Advance functions also carry out or trigger transfers of payload data.

In at least some embodiments, the context's subset of a client's data processing resources is dedicated to the exclusive use of the context. In the example of FIG. 7, context (290) has a subset (294) of a client's (302) data processing resources dedicated to the exclusive use of the context (290), and context (292) has a subset (296) of a client's (302) data processing resources dedicated to the exclusive use of the context (292). Advance functions (268, 270) called on contexts (290, 292) therefore never need to secure a lock on a data communications resource before progressing work on a context—because each context (290, 292) has exclusive use of dedicated data communications resources. Usage of data communications resources in this example PAMI (218), however, is not thread-safe. When data communications resources are shared among contexts, mutual exclusion locks are needed. In contrast to the exclusive usage of resources by contexts (290, 292), contexts (310, 312) share access to their client's data communications resource (314) and therefore do not have data communications resources dedicated to exclusive use of a single context. Contexts (310, 312) therefore always must secure a mutual exclusion lock on a data communications resource before using the resource to send or receive administrative messages or payload data.

```
int main(int argc, char ** argv)
{
    PAMI_client_t client;
    PAMI_context_t context;
    PAMI_result_t status = PAMI_ERROR;
    const char   *name = "PAMI";
    status   = PAMI_Client_initialize(name, &client);
    size_t_n = 1;
    status   = PAMI_Context_createv(client, NULL, 0, &context, _n);
    PAMI_configuration_t configuration;
    configuration.name = PAMI_TASK_ID;
    status = PAMI_Configuration_query(client, &configuration);
    size_t task_id = configuration.value.intval;
    configuration.name = PAMI_NUM_TASKS;
    status = PAMI_Configuration_query(client, &configuration);
    size_t num_tasks = configuration.value.intval;
    fprintf (stderr, "Hello process %d of %d\n", task_id, num_tasks);
    status = PAMI_Context_destroy(context);
    status = PAMI_Client_finalize(client);
    return 0;
}
```

This short program is termed 'pseudocode' because it is an explanation in the form of computer code, not a working model, not an actual program for execution. In this pseudocode example, an application initializes a client and a context for an application named "PAMI." PAMI_Client_initialize and PAMI_Context_createv are initialization functions (316) exposed to applications as part of a PAMI's API. These functions, in dependence upon the application name "PAMI," pull from a PAMI configuration (318) the information needed to establish a client and a context for the application. The application uses this segment:

PAMI_configuration_t configuration;
    configuration.name=PAMI_TASK_ID;
    status=PAMI_Configuration_query(client, &configuration);
    size_t task_id=configuration.value.intval;

to retrieve its task ID and this segment:
   configuration.name=PAMI_NUM_TASKS;
   status=PAMI_Configuration_query(client, &configuration);
   size_t num_tasks=configuration.value.intval;
to retrieve the number of tasks presently configured to carry out parallel communications and fencing of data transfers through the PAMI. The applications prints "Hello process task_id of num_tasks," where task_id is the task ID of the subject instance of a parallel application, and num_tasks is the number of instances of the application executing in parallel on compute nodes. Finally, the application destroys the context and terminates the client.

Figure 10:
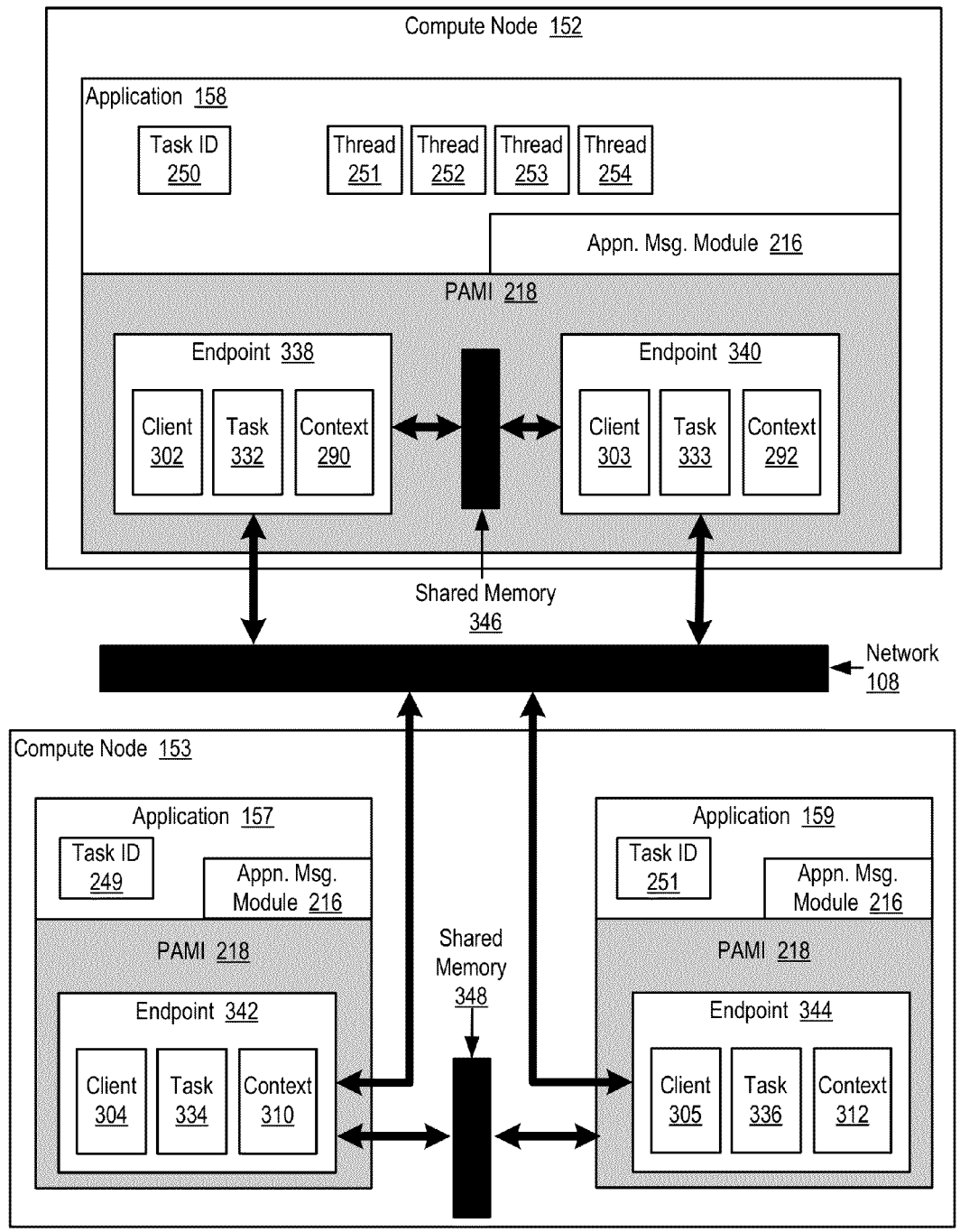
FIG. 10 sets forth a flow chart illustrating an example method of fencing data transfers in a PAMI of a parallel computer according to embodiments of the present invention.

For further explanation, FIG. 10 sets forth a functional block diagram of example endpoints useful in parallel computers that fence data transfers in a PAMI according to embodiments of the present invention. In the example of FIG. 10, a PAMI (218) is implemented with instances on two separate compute nodes (152, 153) that include four endpoints (338, 340, 342, 344). Endpoints are opaque objects to used address an origin or destination in a process and are constructed from a (client, task, context) tuple. Communication operations, such as SEND, PUT, and GET, address a destination with an endpoint object.

Each endpoint (338, 340, 342, 344) in the example of FIG. 10 is composed of a client (302, 303, 304, 305), a task (332, 333, 334, 335), and a context (290, 292, 310, 312). A client is useful as a component in the specification of an endpoint to disambiguate the task and context identifiers, as these identifiers may be the same for multiple clients. A task is useful as a component in the specification of an endpoint to construct an endpoint to address a process accessible through a context. A context is useful as a component in the specification of an endpoint to identify the specific context associated with a the destination or target task—because the context identifies a specific threading point on a task. A context offset identifies which threading point is to process a particular communications operation. Endpoints enable "crosstalk" which is the act of issuing communication on a local context with a particular context offset that is directed to a destination endpoint with no correspondence to a source context or source context offset.

For efficient utilization of storage in an environment where multiple tasks of a client reside on the same physical compute node, an application may choose to write an endpoint table (288, 300 on FIG. 7) in a shared memory area (346, 348). It is the responsibility of the application to allocate this shared memory area and coordinate the initialization and access of any data structures shared between processes. This includes any endpoint objects which are created by one process or instance of an application and read by another process.

Endpoints (342, 344) on compute node (153) serve respectively two application instances (157, 159). The tasks (334, 336) in endpoints (342, 344) are different. The task (334) in endpoint (342) is identified by the task ID (249) of application (157), and the task (336) in endpoint (344) is identified by the task ID (251) of application (159). The clients (304, 305) in endpoints (342, 344) are different, separate clients. Client (304) in endpoint (342) associates data communications resources (e.g., 294, 296, 314 on FIG. 7) dedicated exclusively to the use of application (157), while client (305) in endpoint (344) associates data communications resources dedicated exclusively to the use of application (159). Contexts (310, 312) in endpoints (342, 344) are different, separate contexts. Context (310) in endpoint (342) operates on behalf of application (157) a subset of the data communications resources of client (304), and context (312) in endpoint (344) operates on behalf of application (159) a subset of the data communications resources of client (305).

Contrasted with the PAMIs (218) on compute node (153), the PAMI (218) on compute node (152) serves only one instance of a parallel application (158) with two endpoints (338, 340). The tasks (332, 333) in endpoints (338, 340) are the same, because they both represent a same instance of a same application (158); both tasks (332,333) therefore are identified, either with a same variable value, references to a same object, or the like, by the task ID (250) of application (158). The clients (302, 303) in endpoints (338, 340) are optionally either different, separate clients or the same client. If they are different, each associates a separate collection of data communications resources. If they are the same, then each client (302, 303) in the PAMI (218) on compute node (152) associates a same set of data communications resources and is identified with a same value, object reference, or the like. Contexts (290, 292) in endpoints (338, 340) are different, separate contexts. Context (290) in endpoint (338) operates on behalf of application (158) a subset of the data communications resources of client (302) regardless whether clients (302, 303) are the same client or different clients, and context (292) in endpoint (340) operates on behalf of application (158) a subset of the data communications resources of client (303) regardless whether clients (302, 303) are the same client or different clients. Thus the tasks (332, 333) are the same; the clients (302, 303) can be the same; and the endpoints (338, 340) are distinguished at least by different contexts (290, 292), each of which operates on behalf of one of the threads (251-254) of application (158), identified typically by a context offset or a threading point.

Endpoints (338, 340) being as they are on the same compute node (152) can effect data communications between endpoints (338, 340) through a segment of shared memory (346); communications between endpoints (338, 340) and endpoints (342, 344) on other compute nodes go through the deterministic network (108). Endpoints (342, 344) being as they are on the same compute node (153) can effect data communications between endpoints (342, 344) through a segment of shared memory (348); communications between endpoints (342, 344) and endpoints (338, 340) on other compute nodes go through the deterministic network (108).

Figure 11:
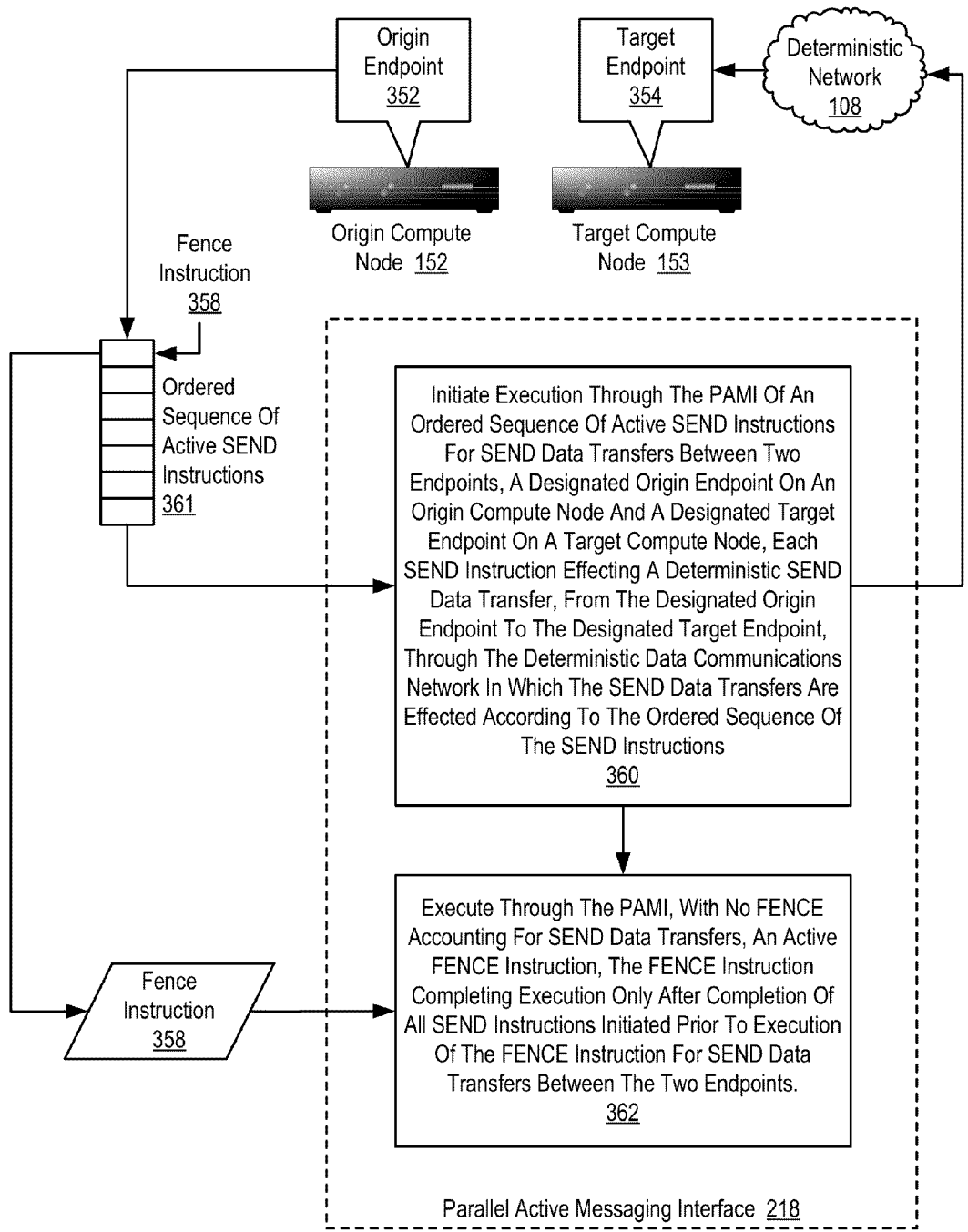
FIG. 11 sets forth a flow chart illustrating an example of a network rendezvous method of fencing data transfers in a PAMI of a parallel computer according to embodiments of the present invention.

For further explanation, FIG. 11 sets forth a flow chart illustrating an example method of fencing data transfers in a PAMI of a parallel computer according to embodiments of the present invention. The method of FIG. 11 is implemented in a PAMI (218) of a parallel computer composed of a number of that execute a parallel application, like those described above in this specification with reference to FIGS. 1-10. The PAMI includes data communications endpoints, with each endpoint specifying data communications parameters for a thread of execution on a compute node, including specifications of a client, a context, and a task, all as described above in this specification with reference to FIGS. 1-10. The compute nodes (152, 153, and 102 on FIG. 1) are coupled for data communications through the PAMI (218) and through data communications resources including a deterministic data communications network (108 on FIG. 1) through which data communications are delivered to target endpoints in the same order in which the communications are transmitted from origin endpoints.

The method of FIG. 11 includes initiating (360) execution through the PAMI (218) of an ordered sequence of active SEND instructions (361) for SEND data transfers between two endpoints, a designated origin endpoint (352) on an origin compute node (152) and a designated target endpoint (354) on a target compute node (153). Each SEND instruction effects a deterministic SEND data transfer, from the designated origin endpoint to the designated target endpoint. The transfer is effected through the deterministic data communications network (108) according to the ordered sequence of the SEND instructions (361). An application or application messaging module initiates execution of the ordered sequence of active SEND instructions by posting (266 or 274 on FIG. 7) the instructions to a work queue (282, 284, 306, or 308 on FIG. 7) of a context (290, 292, 310, or 312 on FIG. 7). Because this sequence of instructions (361) effects data transfers from a single 'designated' endpoint, readers will recognize that the entire sequence of instructions is posted to a same work queue in a same context.

The method of FIG. 11 also includes executing (362) through the PAMI (218), with no FENCE accounting for SEND data transfers, an active FENCE instruction (358). The FENCE instruction is an 'active' instruction in that it is implemented with the aid of callback functions. The FENCE instruction (358) is directed particularly to SEND instructions between the two endpoints (352, 354), and the FENCE instruction (358) completes execution only after completion of all SEND instructions initiated prior to execution of the FENCE instruction for SEND data transfers between the two endpoints. That is, the FENCE instruction executes deterministically with respect to all previously initiated SEND instructions. There are a number of ways in which such deterministic execution can be implemented. An application can post the FENCE instruction to a work queue of a context whose advance functions execute instructions in the work queue strictly in the order in which instructions are posted into the queue—so that execution of the FENCE instruction will not complete until after all previously posted SEND instructions have completed. To the extent that the FENCE instruction requires administrative communications with a target endpoint or target compute node, request to send, advise messages, callbacks, and the like, the deterministic network can enforce sequencing, allowing the FENCE-related communications to complete only after completion of all supporting communications and data transfers of all previously initiated SEND instructions.

Figure 12:
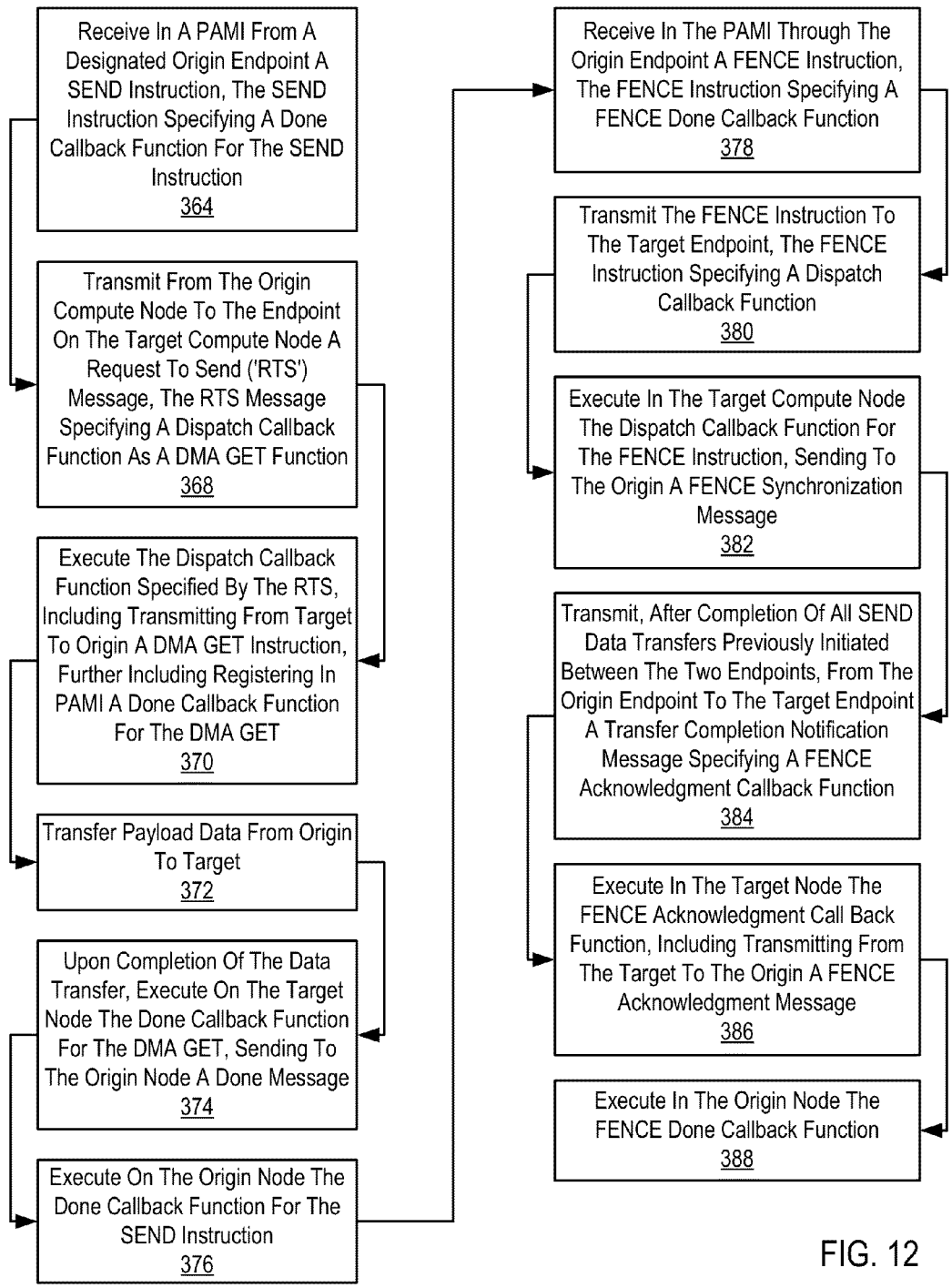
FIG. 12 sets forth a calling sequence diagram illustrating an example of a network rendezvous method of fencing data transfers in a PAMI of a parallel computer according to embodiments of the present invention.
Figure 13:
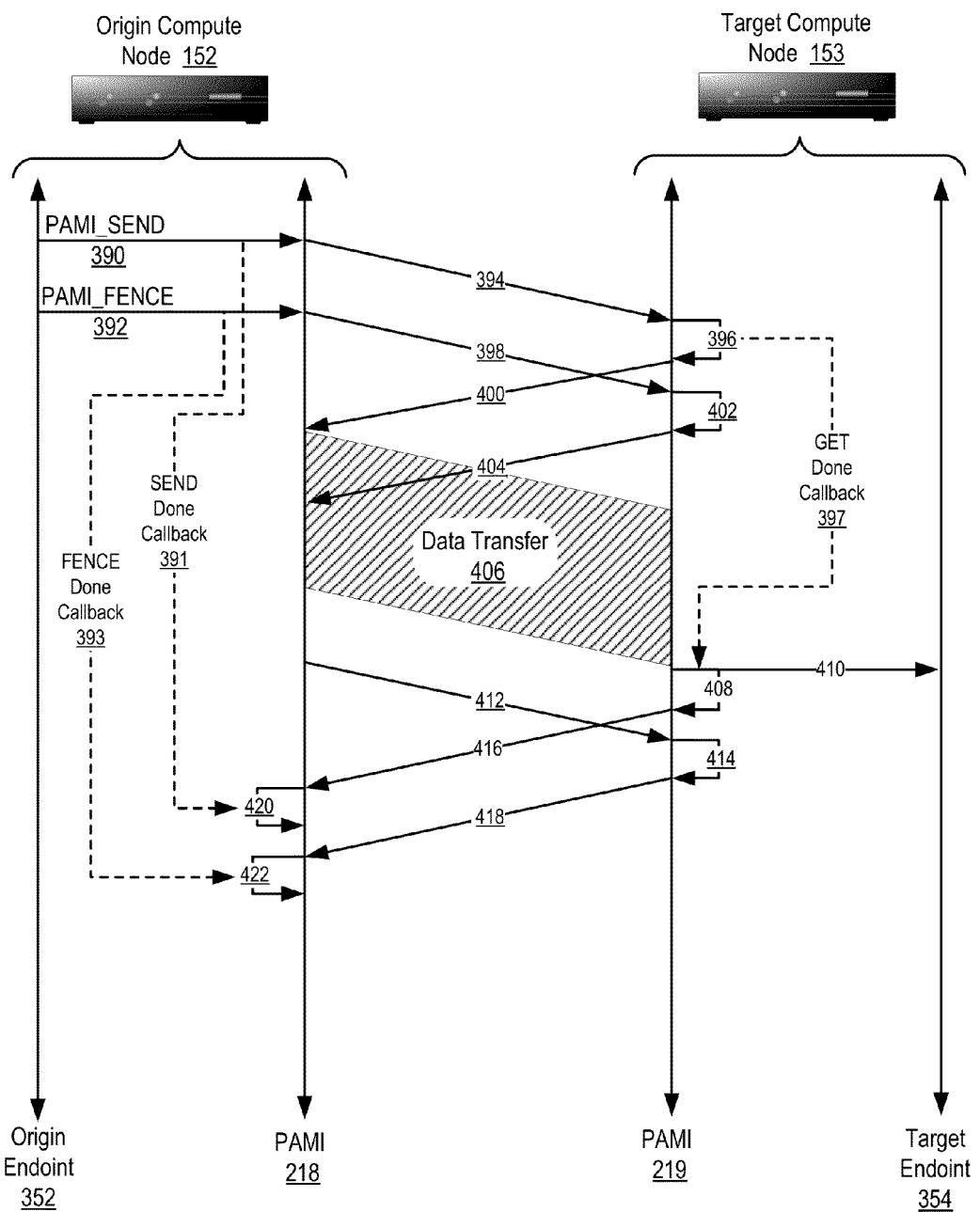
FIG. 13 sets forth a flow chart illustrating an example of an eager method of fencing data transfers in a PAMI of a parallel computer according to embodiments of the present invention.

For further explanation, FIG. 12 sets forth a flow chart illustrating an example of a network rendezvous method of fencing data transfers in a PAMI of a parallel computer according to embodiments of the present invention. A rendezvous method of fencing is a method of fencing for use in a rendezvous messaging protocol. Rendezvous protocols are distinguished from eager protocols. An eager protocol expects to send header information, message ID, addresses, endpoints, buffer addresses, message size, and so on, along with payload data, all in the same message. Eager protocols therefore reduce network traffic for small messages. An eager protocol, however, requires message buffering sufficient for header and payload of an entire message, so that buffer space requirements can be large in an environment with many eager messages. In contrast, a rendezvous protocol is directed toward larger messages with target buffers in application space, so that rendezvous protocols result in more network traffic with reduced demand for buffering in a system messaging layer such as a PAMI. PAMIs for fencing according to embodiments of the present application typically support both rendezvous and eager protocols. FIG. 12 illustrates an example of a rendezvous method of fencing. For further explanation, FIG. 13 sets forth a calling sequence diagram further illustrating the operations of the method of FIG. 12, an example of a network rendezvous method of fencing data transfers in a PAMI of a parallel computer according to embodiments of the present invention. The method of FIG. 12 is described below in this specification, therefore, with reference both to FIG. 12 and also to FIG. 13, using reference numbers from both FIGS. 12 and 13.

The method of FIG. 12 is implemented in a PAMI (218, 219) of a parallel computer composed of a number of compute nodes that execute a parallel application, like those described above in this specification with reference to FIGS. 1-10. The PAMI includes data communications endpoints (352, 354), with each endpoint specifying data communications parameters for a thread of execution on a compute node, including specifications of a client, a context, and a task, all as described above in this specification with reference to FIGS. 1-10. The compute nodes (152, 153 on FIGS. 13 and 102 on FIG. 1) are coupled for data communications through the PAMI (218, 219) and through data communications resources including a deterministic data communications network (108 on FIGS. 1, 4, and 10) through which data communications are delivered to target endpoints in the same order in which the communications are transmitted from origin endpoints.

The method of FIG. 12 includes receiving (364) in a PAMI (218) from a designated origin endpoint (352) a SEND instruction (390). The SEND instruction (390) specifies a data transfer to a target endpoint (354) on a target node (153), and the SEND instruction also specifies a SEND done callback function (391) for the SEND instruction which is registered in the PAMI. The done callback function (391) is an application-level instruction called by an advance function of a PAMI when execution of the SEND instruction is fully complete. The SEND done callback (391) can carry out any actions desired by the application at that point, but readers will recognize that one purpose of the done callback is to advise the calling application of completion of the data transfer. The SEND instruction (390) is received in the PAMI from an application or an application messaging module through a post to a context of the origin endpoint (352). The application's post of the SEND instruction was non-blocking, so that the application continued other work while the PAMI executes the SEND instruction. Not blocking to wait for the SEND instruction to complete, it is common for the application to want a callback to advise of completion of the data transfer effected by the SEND.

The method of FIG. 12 also includes transmitting (368) by the PAMI from the origin compute node (152) to the endpoint (354) on the target compute (153) node a Request To Send ('RTS') message (394). The RTS message (394) specifies a dispatch callback function (not shown) as a DMA GET function. The dispatch callback is a callback function to be called upon dispatch, that is, upon receipt of the RTS by the target endpoint. The RTS is transmitted by action of an advance function called on a context of the origin endpoint (352). The RTS is received by action of an advance function, called by an application on a context of the target endpoint (354), checking its data communications resources for incoming RTS messages and executing any dispatch callbacks that it finds there.

The method of FIG. 12 also includes executing (370, 396) by the PAMI (219) the dispatch callback function specified by the RTS, that is, a DMA GET. The DMA GET is a one-sided DMA operation, transparent to the origin compute node, carried out with information provided in the RTS (394), buffer address, message size, and so on. An advance function called by an application on a context of the target endpoint (354) executes the dispatch callback. Executing the dispatch callback includes transmitting from the target endpoint (354) to the origin endpoint (352) a DMA GET instruction (400). Executing the dispatch callback also includes registering in PAMI a done callback function (397) for the DMA GET. The method of FIG. 12 also includes, responsive to the DMA GET message (400), transferring (372, 406) by the PAMI (218) payload data from the origin endpoint (352) to the target endpoint (354).

The method of FIG. 12 also includes executing (374, 408), upon completion of the data transfer (406), by the PAMI (219) on the target node (153) the done callback function (397) for the DMA GET, including advising (410) the target endpoint (354) of the arrival of the transfer data and sending to the origin node a SEND done message (416) advising the origin PAMI (218) of completion of the data transfer (406).

The method of FIG. 12 also includes executing (376, 420) by PAMI (218) on the origin node (152) the done callback function for the SEND instruction. An advance function called by an application on a context of the origin endpoint (352), checking its data communications resources for incoming messages, notes the arrival of the SEND done message (416), and executes the previously registered SEND done callback (391).

The method of FIG. 12 also includes receiving (378) in the PAMI (218) through the origin endpoint (352) a FENCE instruction (392) directed particularly to SEND operations between the origin endpoint (352) and the target endpoint (354). The FENCE instruction specifies a FENCE done callback function (393) which is registered in the PAMI for later use. The FENCE done callback function (393) is an application-level instruction called by an advance function of a PAMI when execution of the FENCE instruction is fully complete. The FENCE done callback (393) can carry out any actions desired by the application at that point, but readers will recognize that one purpose of the done callback is to advise the calling application of completion of the FENCE. The FENCE instruction (392) is received in the PAMI from an application or an application messaging module through a post to a context of the origin endpoint (352). The application's post of the FENCE instruction was non-blocking, so that the application continues other work while the PAMI executes the FENCE instruction. Not blocking to wait for the FENCE instruction to complete, it is common for the application to want a callback to advise of completion of the FENCE and therefore of all the data transfer effected by previous SEND instructions.

It is typical of a calling application, after issuing the FENCE instruction, to cease further messaging operations between the two endpoints that are the subject of the FENCE until completion of all SEND data transfers previously initiated between the two endpoints—signified by completion of the FENCE—signified by the execution of the FENCE done callback advising the calling application that the FENCE has completed. It is not a function of the FENCE to block messaging operations between the endpoints until completion of the FENCE; the application itself must provide this function, and messaging will probably continue between other endpoints on behalf of the same application. On the other hand, most applications behave this way because it is in the application's interest to know by the FENCE when all transfers between those two particular endpoints has completed; that is the purpose of the FENCE call in the first place.

The method of FIG. 12 also includes transmitting (380) by the PAMI the FENCE instruction (398) to the target endpoint (354), the FENCE instruction specifying a dispatch callback function (not shown). The dispatch callback is a callback function to be called upon dispatch, that is, upon receipt of the FENCE instruction by the target endpoint, or at least in the target PAMI (219). The FENCE instruction (398) is transmitted by action of an advance function called on a context of the origin endpoint (352), the context in which the FENCE instruction was posted. The FENCE instruction (398) is received by action of an advance function, called by an application on a context of the target endpoint (354), checking its data communications resources for incoming messages and executing any dispatch callbacks that it finds there. So the FENCE instruction is transmitted to the target endpoint in the sense that an advance function of the target endpoint processes the FENCE instruction when it arrives in the target PAMI.

The method of FIG. 12 also includes executing (382, 402) by the PAMI (219) in the target compute node (153) the dispatch callback function for the FENCE instruction (398), sending to the PAMI (218) for the origin endpoint (352) a FENCE synchronization message (404). In an embodiment, the FENCE synchronization message is implemented as a zero byte GET instruction, a nonsense instruction, GET nothing, except that advance functions of the PAMI (218) are improved to interpret such a zero byte GET as a component of FENCE execution, a component that identifies itself as such. Such a zero byte GET travels a deterministic network so that it arrives in the origin PAMI (218) after all the DMA GETs (400) of all previously initiated SEND instructions. The example of FIG. 13, for ease of illustration, shows only one SEND instruction and only one DMA GET (400), although readers will recognize that PAMI fencing of data transfers according to embodiments of the present invention are typically directed to many SENDs and many DMA GETs, all of which must complete before the FENCE completes. In deterministic network traffic, the FENCE synchronization message (404) cannot arrive in the source PAMI (218) until after all pertinent DMA GETs have arrived in the source PAMI, and, implemented as a zero byte GET, the FENCE synchronization message (400) cannot be processed, executed as a zero byte GET, until all previously initiated SENDs and DMA GETs are fully processed.

The method of FIG. 12 also includes, responsive to the FENCE synchronization message (404), transmitting (384), after completion of all SEND data transfers previously initiated between the two endpoints, from the origin endpoint (352) to the target endpoint (354) a transfer completion notification message (412) specifying a FENCE acknowledgment callback function (not shown). In an embodiment, the transfer completion notification message is implemented as a zero-byte data transfer message transmitted in response to a zero byte GET (404). Again it would make little sense to simply send a transfer message with no data, but again, advance functions of the PAMI are improved to recognize the zero byte transfer as a component of a FENCE and execute the specified FENCE acknowledgment callback.

The method of FIG. 12 also includes executing (386, 414) by PAMI (219) in the target node (153) the FENCE acknowledgment call back function, including transmitting from the target PAMI (219) to the origin PAMI (218) a FENCE acknowledgment message (418). The method of FIG. 12 also includes executing (388, 422) by PAMI (218) in the origin node (152) the FENCE done callback function (393), which was registered in the PAMI earlier when execution of the FENCE (392) first began. That is, an advance function called on a context of the origin endpoint (352), monitors incoming messages on its assigned data communications resources, recognizes the incoming FENCE acknowledgement as full completion of the FENCE (392) and calls the appropriate FENCE done callback (393) previously registered with the PAMI (218).

Figure 14:
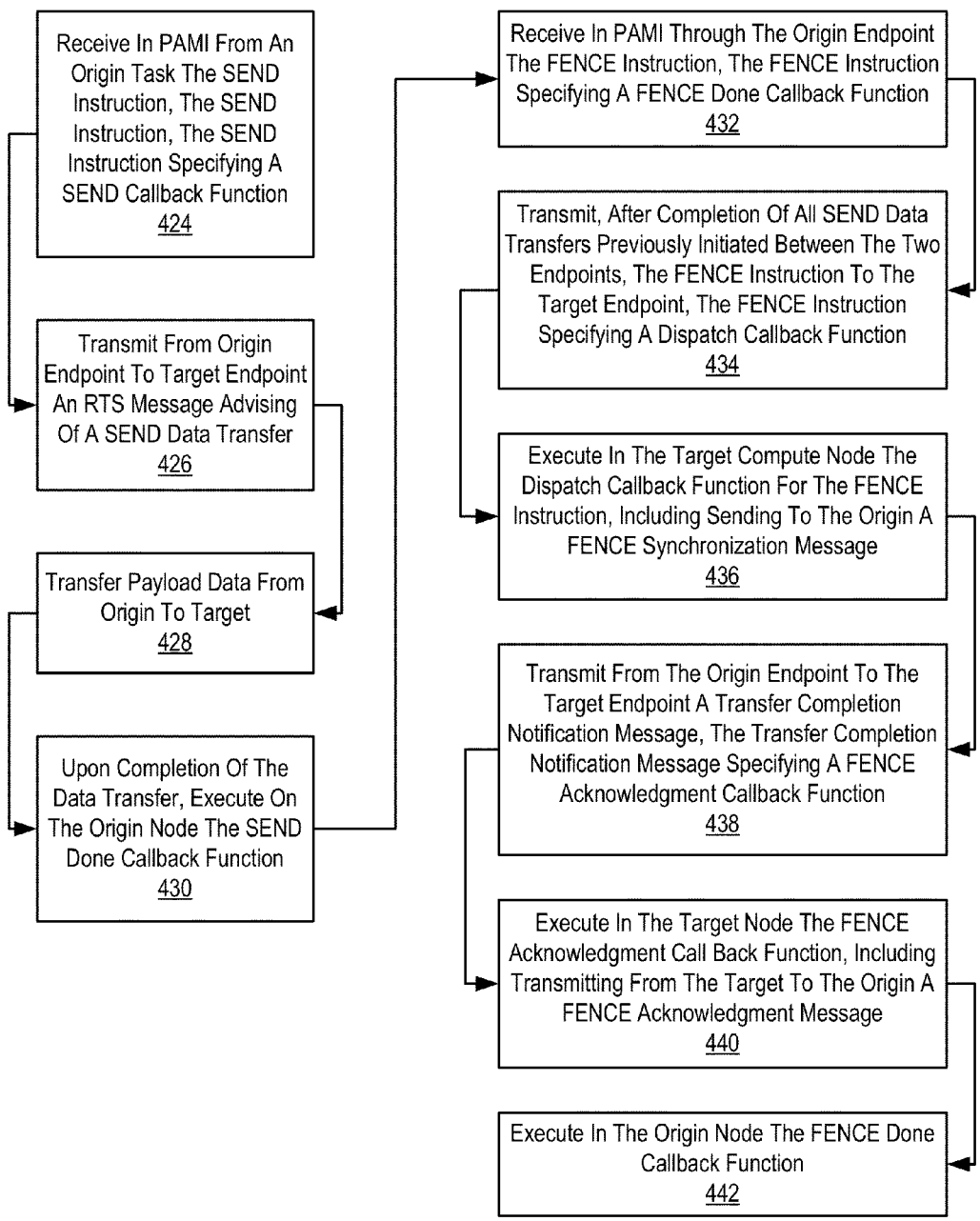
FIG. 14 sets forth a calling sequence diagram illustrating an example of an eager method of fencing data transfers in a PAMI of a parallel computer according to embodiments of the present invention.
Figure 15:
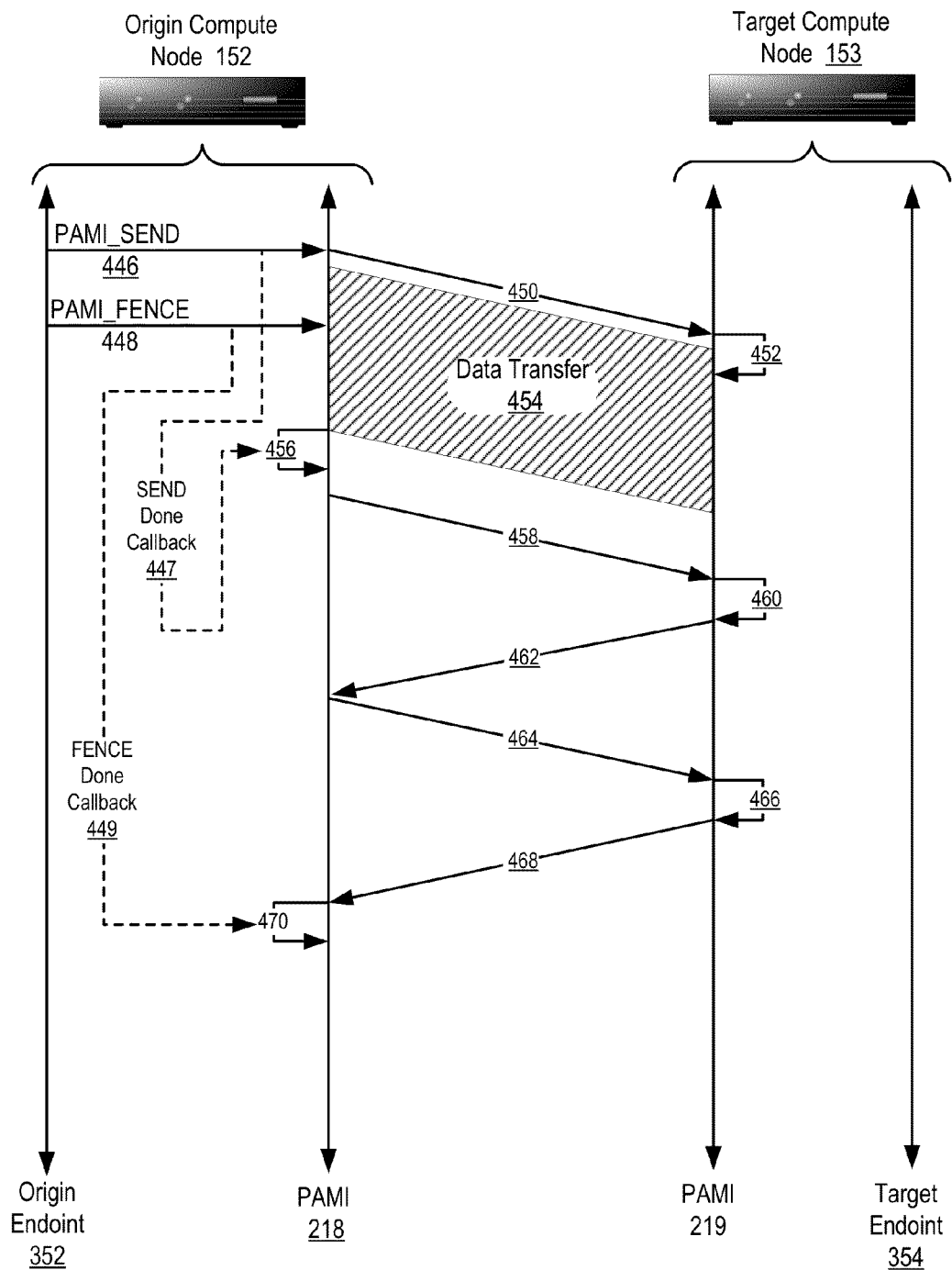

For further explanation, FIG. 14 sets forth a flow chart illustrating an example of an eager method of fencing data transfers in a PAMI of a parallel computer according to embodiments of the present invention. An eager method of fencing is a method of fencing for use in an eager messaging protocol. Eager protocols are distinguished from rendezvous protocols. An eager protocol expects to send header information, message ID, addresses, endpoints, buffer addresses, message size, and so on, along with payload data, all in the same message. Eager protocols therefore reduce network traffic for small messages. An eager protocol, however, requires message buffering sufficient for header and payload of an entire message, so that buffer space requirements can be large in an environment with many eager messages. In contrast, a rendezvous protocol is directed toward larger messages with target buffers in application space, so that rendezvous protocols result in more network traffic with reduced demand for buffering in a system messaging layer such as a PAMI. PAMIs for fencing according to embodiments of the present application typically support both rendezvous and eager protocols. FIG. 14 illustrates an example of a rendezvous method of fencing. For further explanation, FIG. 15 sets forth a calling sequence diagram further illustrating the operations of the method of FIG. 14, an example of a network eager method of fencing data transfers in a PAMI of a parallel computer according to embodiments of the present invention. The method of FIG. 14 is described below in this specification, therefore, with reference both to FIG. 14 and also to FIG. 15, using reference numbers from both FIGS. 14 and 15.

The method of FIG. 14 is implemented in a PAMI (218, 219) of a parallel computer composed of a number of that execute a parallel application, like those described above in this specification with reference to FIGS. 1-10. The PAMI includes data communications endpoints (352, 354), with each endpoint specifying data communications parameters for a thread of execution on a compute node, including specifications of a client, a context, and a task, all as described above in this specification with reference to FIGS. 1-10. The compute nodes (152, 153 on FIGS. 15 and 102 on FIG. 1) are coupled for data communications through the PAMI (218, 219) and through data communications resources including a deterministic data communications network (108 on FIGS. 1, 4, and 10) through which data communications are delivered to target endpoints in the same order in which the communications are transmitted from origin endpoints.

The method of FIG. 14 includes receiving (424) in PAMI from an origin task a SEND instruction (446). The SEND instruction (446) specifies a data transfer to a target endpoint (354) on a target node (153), and the SEND instruction also specifies a SEND done callback function (447) for the SEND instruction which is registered in the PAMI (218). The method of FIG. 14 also includes transmitting (426) by PAMI from the origin endpoint (352) to the target endpoint (354) an RTS message (450) advising of a SEND data transfer. That is, a dispatch callback (452) of the RTS advises the target endpoint (354) of a pending SEND transfer, buffer addresses, message size, and so on. The method of FIG. 14 also includes transferring (428) by the PAMI payload data (454) from the origin endpoint to the target endpoint. The method of FIG. 14 also includes, executing (430, 456), upon completion of the data transfer (454), by PAMI (218) on the origin node (152) the SEND done callback function (447) previously registered in the PAMI.

The method of FIG. 14 also includes receiving (432) in the PAMI (218) through the origin endpoint (352) a FENCE instruction (448) directed particularly to SEND operations between the origin endpoint (352) and the target endpoint (354). The FENCE instruction specifies a FENCE done callback function (449) which is registered in the PAMI for later use. It is typical of a calling application, after issuing the FENCE instruction, to cease further messaging operations between the two endpoints that are the subject of the FENCE until completion of all SEND data transfers previously initiated between the two endpoints—signified by completion of the FENCE—signified by the execution of the FENCE done callback advising the calling application that the FENCE has completed. It is not a function of the FENCE to block messaging operations between the endpoints until completion of the FENCE; the application itself must provide this function, and messaging will probably continue between other endpoints on behalf of the same application. On the other hand, most applications behave this way because it is in the application's interest to know by the FENCE when all transfers between those two particular endpoints has completed; that is the purpose of the FENCE call in the first place.

The method of FIG. 14 also includes transmitting (434) by the PAMI (218), after completion of all SEND data transfers previously initiated between the two endpoints, the FENCE instruction (458) to the target endpoint (354), the FENCE instruction specifying a dispatch callback function (not shown). The dispatch callback is a callback function to be called upon dispatch, that is, upon receipt of the FENCE instruction by the target endpoint, or at least in the target PAMI (219). The FENCE instruction (458) is transmitted by action of an advance function called on a context of the origin endpoint (352), the context in which the FENCE instruction was posted. The FENCE instruction (458) is received by action of an advance function, called by an application on a context of the target endpoint (354), checking its data communications resources for incoming messages and executing any dispatch callbacks that it finds there. So the FENCE instruction is transmitted to the target endpoint in the sense that an advance function of the target endpoint processes the FENCE instruction when it arrives in the target PAMI.

The method of FIG. 14 also includes executing (436, 460) by the PAMI (219) in the target compute node (153) the dispatch callback function for the FENCE instruction (458), sending to the PAMI (218) for the origin endpoint (352) a FENCE synchronization message (462). In an embodiment, the FENCE synchronization message is implemented as a zero byte GET instruction, a nonsense instruction, GET nothing, except that advance functions of the PAMI (218) are improved to interpret such a zero byte GET as a component of FENCE execution, a component that identifies itself as such. Such a zero byte GET travels a deterministic network so that it arrives in the origin PAMI (218) after all data transfers (454) of all previously initiated SEND instructions. The example of FIG. 15, for ease of illustration, shows only one SEND instruction and only data transfer (454), although readers will recognize that PAMI fencing of data transfers according to embodiments of the present invention are typically directed to many SENDs and many data transfers, all of which must complete before the FENCE completes. In deterministic network traffic, the FENCE synchronization message (462) cannot arrive in the source PAMI (218) until after all pertinent data transfers (454) have been sent from the source PAMI (218), and, implemented as a zero byte GET, the FENCE synchronization message (462) cannot be processed, executed as a zero byte GET, until all previously initiated SENDs and their data transfers are fully processed.

The method of FIG. 14 also includes transmitting (438), responsive to the FENCE synchronization message (462), from the origin endpoint (352) to the target endpoint (354) a transfer completion notification message (464) specifying a FENCE acknowledgment callback function (not shown). In an embodiment, the transfer completion notification message is implemented as a zero-byte data transfer message transmitted in response to a zero byte GET (462). Again it would make little sense to simply send a transfer message with no data, but again, advance functions of the PAMI are improved to recognize the zero byte transfer as a component of a FENCE and execute the specified FENCE acknowledgment callback.

The method of FIG. 14 also includes executing (440, 466) by PAMI (219) in the target node (153) the FENCE acknowledgment call back function, including transmitting from the target PAMI (219) to the origin PAMI (218) a FENCE acknowledgment message (468). The method of FIG. 14 also includes executing (442, 470) by the PAMI (218) in the origin node (152) the FENCE done callback function (449), which was registered in the PAMI earlier when execution of the FENCE (448) first began. That is, an advance function called on a context of the origin endpoint (352), monitors incoming messages on its assigned data communications resources, recognizes the incoming FENCE acknowledgement as full completion of the FENCE (448) and calls the appropriate FENCE done callback (449) previously registered with the PAMI (218).

In view of the explanations set forth above, readers will recognize that the benefits of fencing data transfers in a PAMI of a parallel computer according to embodiments of the present invention include a new fence protocol that provides low-latency, eliminates network congestion due to the fence, and eliminates the need for counter arrays. Indeed, fencing data transfers according to embodiments of the present invention is carried out without maintaining any status information whatsoever on fenced data transfer messages.

Example embodiments of the present invention are described largely in the context of a fully functional parallel computer that fences data transfers in a parallel active messaging interface ('PAMI'). Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable media having computer readable program code embodied thereon.

Any combination of one or more computer readable media may be utilized. Such a computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described in this specification with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A parallel computer that fences data transfers in a parallel active messaging interface ('PAMI'), comprising:
   receiving, at an origin endpoint in the PAMI, a plurality of non-blocking SEND instructions from an application, wherein each of the plurality of SEND instruction specifies a data transfer from the origin endpoint to a target endpoint in the PAMI;
   receiving, at an origin endpoint, a FENCE instruction corresponding to transfers between the origin endpoint and the target endpoint,
      wherein the FENCE instruction advises the application when the transfers between the origin endpoint and the target endpoint are complete,
      wherein the origin endpoint is on an origin compute node and the target endpoint on a target compute node, and
      wherein the transfers between the origin endpoint and the target endpoint occur across a deterministic data communications network;
   posting the plurality of SEND instruction in an ordered sequence in a work queue of the origin endpoint;
   posting the FENCE instruction in the work queue of the origin endpoint at a location in the ordered sequence such that the FENCE instruction is processed after each of the plurality of SEND instructions is processed; and
   executing, by the origin endpoint, an advance function comprising initiating execution through the PAMI of instructions in the work queue, such that the FENCE instruction executing only after completion of all SEND instructions initiated prior to the FENCE instruction in the work queue, wherein execution of the FENCE instruction indicates to the application that execution of the SEND instructions is complete.

2. The parallel computer of claim 1 wherein:
   the client comprises a collection of data communications resources dedicated to the exclusive use of an application-level data processing entity;
   the context comprises a subset of the collection of data processing resources, context functions, and a work queue of data transfer instructions to be performed by use of the subset through the context functions operated by an assigned thread of execution; and
   the task comprises a process of execution for the parallel application.

3. The parallel computer of claim 1 wherein each context carries out, through post and advance functions, data communications for the application on data communications resources in the exclusive possession of that context.

4. The parallel computer of claim 1 wherein each context carries out data communications operations independently and in parallel with other contexts.

5. The parallel computer of claim 1 wherein executing a FENCE instruction further comprises:
   receiving in the PAMI through the origin endpoint the FENCE instruction, the FENCE instruction specifying a FENCE done callback function;
   transmitting by the PAMI the FENCE instruction to the target endpoint, the FENCE instruction specifying a dispatch callback function;
   executing by the PAMI in the target compute node the dispatch callback function for the FENCE instruction, sending to the origin a FENCE synchronization message;
   responsive to the FENCE synchronization message, transmitting by the PAMI from the origin endpoint to the target endpoint a transfer completion notification message after completion of all SEND data transfers previously initiated between the two endpoints, the transfer completion notification message specifying a FENCE acknowledgment callback function;
   executing by the PAMI in the target node the FENCE acknowledgment call back function, including transmitting from the target to the origin a FENCE acknowledgment message; and
   executing by the PAMI in the origin node the FENCE done callback function.

6. The parallel computer of claim 1 wherein executing a FENCE instruction further comprises:
   receiving in the PAMI through the origin endpoint the FENCE instruction, the FENCE instruction specifying a FENCE done callback function;
   transmitting by the PAMI, after completion of all SEND data transfers previously initiated between the two endpoints, the FENCE instruction to the target endpoint, the FENCE instruction specifying a dispatch callback function;
   executing by the PAMI in the target compute node the dispatch callback function for the FENCE instruction, including sending to the origin a FENCE synchronization message;

responsive to the FENCE synchronization message, transmitting by the PAMI from the origin endpoint to the target endpoint a transfer completion notification message, the transfer completion notification message specifying a FENCE acknowledgment callback function;

executing by the PAMI in the target node the FENCE acknowledgment call back function, including transmitting from the target to the origin a FENCE acknowledgment message; and executing by the PAMI in the origin node the FENCE done callback function.

7. A computer program product for fencing data transfers in a parallel active messaging interface ('PAMI') of a parallel computer, the computer program product disposed on a computer readable storage medium, the computer readable storage medium is not a signal, the computer program product comprising computer program instructions capable, when executed, of causing the parallel computer to function by:

receiving, at an origin endpoint in the PAMI, a plurality of non-blocking SEND instructions from an application, wherein each of the plurality of SEND instruction specifies a data transfer from the origin endpoint to a target endpoint in the PAMI;

receiving, at an origin endpoint, a FENCE instruction corresponding to transfers between the origin endpoint and the target endpoint,
  wherein the FENCE instruction advises the application when the transfers between the origin endpoint and the target endpoint are complete,
  wherein the origin endpoint is on an origin compute node and the target endpoint on a target compute node, and
  wherein the transfers between the origin endpoint and the target endpoint occur across a deterministic data communications network;

posting the plurality of SEND instruction in an ordered sequence in a work queue of the origin endpoint;

posting the FENCE instruction in the work queue of the origin endpoint at a location in the ordered sequence such that the FENCE instruction is processed after each of the plurality of SEND instructions is processed; and executing, by the origin endpoint, an advance function comprising initiating execution through the PAMI of instructions in the work queue, such that the FENCE instruction executing only after completion of all SEND instructions initiated prior to the FENCE instruction in the work queue, wherein execution of the FENCE instruction indicates to the application that execution of the SEND instructions is complete.

8. The computer program product of claim 7 wherein:
the client comprises a collection of data communications resources dedicated to the exclusive use of an application-level data processing entity;
the context comprises a subset of the collection of data processing resources, context functions, and a work queue of data transfer instructions to be performed by use of the subset through the context functions operated by an assigned thread of execution; and
the task comprises a process of execution for the parallel application.

9. The computer program product of claim 7 wherein each context carries out, through post and advance functions, data communications for the application on data communications resources in the exclusive possession of that context.

10. The computer program product of claim 7 wherein each context carries out data communications operations independently and in parallel with other contexts.

11. The computer program product of claim 7 wherein executing a FENCE instruction further comprises:

receiving in the PAMI through the origin endpoint the FENCE instruction, the FENCE instruction specifying a FENCE done callback function;

transmitting by the PAMI the FENCE instruction to the target endpoint, the FENCE instruction specifying a dispatch callback function;

executing by the PAMI in the target compute node the dispatch callback function for the FENCE instruction, sending to the origin a FENCE synchronization message;

responsive to the FENCE synchronization message, transmitting by the PAMI from the origin endpoint to the target endpoint a transfer completion notification message after completion of all SEND data transfers previously initiated between the two endpoints, the transfer completion notification message specifying a FENCE acknowledgment callback function;

executing by the PAMI in the target node the FENCE acknowledgment call back function, including transmitting from the target to the origin a FENCE acknowledgment message; and executing by the PAMI in the origin node the FENCE done callback function.

12. The computer program product of claim 7 wherein executing a FENCE instruction further comprises:

receiving in the PAMI through the origin endpoint the FENCE instruction, the FENCE instruction specifying a FENCE done callback function;

transmitting by the PAMI, after completion of all SEND data transfers previously initiated between the two endpoints, the FENCE instruction to the target endpoint, the FENCE instruction specifying a dispatch callback function;

executing by the PAMI in the target compute node the dispatch callback function for the FENCE instruction, including sending to the origin a FENCE synchronization message;

responsive to the FENCE synchronization message, transmitting by the PAMI from the origin endpoint to the target endpoint a transfer completion notification message, the transfer completion notification message specifying a FENCE acknowledgment callback function;

executing by the PAMI in the target node the FENCE acknowledgment call back function, including transmitting from the target to the origin a FENCE acknowledgment message; and executing by the PAMI in the origin node the FENCE done callback function.

* * * * *